(12) United States Patent
Lim et al.

(10) Patent No.: US 9,745,082 B2
(45) Date of Patent: Aug. 29, 2017

(54) RAPID SLEW AND SETTLE SYSTEMS FOR SMALL SATELLITES

(71) Applicant: The Charles Stark Draper Laboratory, Inc., Cambridge, MA (US)

(72) Inventors: Sungyung Lim, Acton, MA (US); Seamus Tuohy, Newton, MA (US); Daniel Dionne, Nashua, NH (US); Laurent Duchesne, Brookline, MA (US); Louis Breger, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/140,065

(22) Filed: Apr. 27, 2016

(65) Prior Publication Data

US 2016/0355279 A1    Dec. 8, 2016

Related U.S. Application Data

(60) Provisional application No. 62/169,736, filed on Jun. 2, 2015, provisional application No. 62/387,188, filed on Dec. 23, 2015.

(51) Int. Cl.
*B64G 1/28* (2006.01)
*B64G 1/24* (2006.01)
*G05D 1/08* (2006.01)

(52) U.S. Cl.
CPC ............. *B64G 1/286* (2013.01); *B64G 1/242* (2013.01); *B64G 1/283* (2013.01); *G05D 1/0883* (2013.01); *B64G 2001/245* (2013.01)

(58) Field of Classification Search
CPC ........ B64G 1/286; B64G 1/283; B64G 1/242; B64G 2001/245; G05D 1/0883
See application file for complete search history.

(56) References Cited

U.S. PATENT DOCUMENTS

| 4,242,917 | A | * | 1/1981 | Bennett | .................. | G01C 19/16 |
| | | | | | | 74/5 F |
| 5,054,719 | A | * | 10/1991 | Maute | ...................... | B64G 1/24 |
| | | | | | | 244/164 |
| 5,796,922 | A | * | 8/1998 | Smith | ................ | G05B 13/0265 |
| | | | | | | 700/252 |

(Continued)

OTHER PUBLICATIONS

Dionne et al., Conference Paper: *Rapid Slew and Settle of a Small Satellite in LEO Laser Communication*, 29th Annual AIAA/USU Conference on Small Satellites, Technical Session VI: Ground Systems and Communications (SSC15-VI-6), http://digitalcommons.usu.edu/smallsat/2015/all2015/42/ , 12 pages, Jul. 2015.

(Continued)

*Primary Examiner* — Rodney Butler
(74) *Attorney, Agent, or Firm* — Sunstein Kann Murphy & Timbers LLP

(57) ABSTRACT

A new approach for rapid slew and settle of small satellites is based on four single degree-of-freedom control moment gyroscopes with variable speed flywheels (or reaction wheels) in a pyramid configuration, combined with path and endpoint constraint time-optimal control. The path and endpoint constrained time-optimal control can be augmented with momentum management without the use of additional actuators.

23 Claims, 25 Drawing Sheets

(56) References Cited

U.S. PATENT DOCUMENTS

| | | | |
|---|---|---|---|
| 6,241,194 B1 | 6/2001 | Heiberg | 244/165 |
| 8,880,246 B1* | 11/2014 | Karpenko | B64G 1/24 |
| | | | 244/158.1 |
| 2008/0035797 A1 | 2/2008 | Defendini et al. | 244/165 |
| 2012/0199697 A1* | 8/2012 | Nagabhushan | B64G 1/286 |
| | | | 244/165 |
| 2016/0107769 A1* | 4/2016 | Verbin | G01C 19/30 |
| | | | 244/165 |

OTHER PUBLICATIONS

Steyn, "A dual-wheel multi-mode spacecraft actuator for near-minimum-time large angle slew maneuvers," Aerospace Science and Technology, vol. 12, No. 7, Oct. 2008, 10 pages.

International Searching Authority, International Search Report and Written Opinion for PCT/US2016/029546, mailed Aug. 11, 2016, 8 pages.

* cited by examiner

RAPID SLEW AND SETTLE SYSTEMS FOR SMALL SATELLITES

CROSS-REFERENCE TO RELATED APPLICATION(S)

This patent application claims the benefit of U.S. Provisional Patent Application No. 62/169,736 entitled RAPID SLEW AND SETTLE SYSTEM OF SMALL SATELLITE filed on Jun. 2, 2015, which is hereby incorporated herein by reference in its entirety.

This patent application also claims the benefit of U.S. Provisional Patent Application No. 62/387,188 entitled RAPID SLEW AND SETTLE SYSTEMS FOR SMALL SATELLITES filed on Dec. 23, 2015, which is hereby incorporated herein by reference in its entirety.

STATEMENT REGARDING PRIOR DISCLOSURES BY THE INVENTOR OR A JOINT INVENTOR UNDER 37 C.F.R. 1.77(b)(6)

Aspects of the present invention were disclosed by one or more of the inventors at the 29$^{th}$ Annual AIAA/USU Conference on Small Satellites, Logan, Utah, August 2015. The following conference paper authored by the inventors was published on or about Jul. 31, 2015: Dionne, D. et al. 2015. "Rapid Slew and Settle of a Small Satellite in LEO Laser Communication," Proceedings of the AIAA/USU Conference on Small Satellites, Technical Session VI: Ground Systems and Communications, SSC15-VI-6. http://digitalcommons.usu.edu/smallsat/2015/all2015/42/. A copy of the published paper is provided on a concurrently filed Information Disclosure Statement pursuant to the guidance of 78 Fed. Reg. 11076 (Feb. 14, 2013). This disclosure and publication came after the filing of the above-referenced provisional patent application from which this patent application claims priority.

FIELD OF THE INVENTION

The present invention relates generally to satellite retargeting systems, and, more particularly, to rapid slew and settle systems for small satellites using hybrid control moment gyroscopes.

BACKGROUND OF THE INVENTION

Small space satellites can be used for a large variety of applications. One issue with small space satellites involves the ability to quickly and accurately retarget the satellite, e.g., to aim an element of the satellite (e.g., a communications transmitter or receiver, a camera, a laser, etc.) at a target (e.g., a terrestrial- or space-based target).

The following references are cited throughout this patent application, each of which is hereby incorporated herein by reference:

Reference 1. Patankar K., Normal Fitz-Coy, and Roithmayr, C., "Design Considerations for Miniaturized Control Moment Gyroscopes for Rapid Retargeting and Precision Pointing of Small Satellites," Proceedings of the 28th Annual AIAA/USU Conference on Small Satellites, Logan, Utah, August 2014.

Reference 2. Wie, B., Bailey, D., and Heiberg C., "Singularity Robust Steering Logic for Redundant Single-Gimbal Control Moment Gyros," Journal of Guidance, Control & Dynamics, Vol. 24, No. 5, September-October 2001.

Reference 3. Garg, D., Patterson, M., Hager W., Rao, A., Benson, D., Huntington, G., "An Overview of Three Pseudospectral Methods for the Numerical Solution of Optimal Control Problems," AAS-09-332, 2009.

Reference 4. Patterson, M., and Rao, A., "GPOPS-ii Version 2.0: A General-Purpose MATLAB Software for Solving Multiple-Phase Optimal Control Problems," ttp://www.gpops2.com. May 2014.

Reference 5. BridgeSat Inc., http://www.bridgesatinc.com.

Reference 6. Gill, P., Murray W., and Saunders M., "SNOPT: An SQP algorithm for Large-scale Constrained Optimization," SIAM Review 47, 1, 99-131, 2002.

Reference 7. Ross, M. and Karpenko M., "A Review of Pseudospectral Optimal Control: From Theory to Flight", Annual Review in Control 36, 182-197, 2012.

Reference 8. Betts, J., "Practical Methods for Optimal Control and Estimation Using Nonlinear Programming", SIAM Series in Advances in Design and Control, Chapter 2.

Reference 9. Maes, C., "A Regularized Active-Set Method for Sparse Convex Quadratic Programming", Ph.D. Dissertation, Stanford, November 2010.

Reference 10. Davis T., "Direct Methods for Sparse Linear Systems", Society for Industrial and Applied Mathematics, Philadelphia, Pa., 2006.

Reference 11. Wright and Nocedal, "Numerical Optimization", 2nd Edition, Springer Science+Business Media, LLC, New York, N.Y., 2006.

Reference 12. U.S. Pat. No. 8,880,246 entitled "Method and Apparatus for Determining Spacecraft Maneuvers," Nov. 4, 2014.

Reference 13. Yoon, H. and Panagiotis, T., "Singularity Analysis of Variable-Speed Control Moment Gyros", Journal of Guidance, Control, and Dynamics, Vol. 27, No. 3, May-June 2004, pp. 374-386.

Rapid retargeting and precision pointing of small satellites has drawn great interest as laser communication networks using Low Earth Orbit (LEO) constellations of small satellites has arisen as a potential alternative to already saturated RF communication [see Reference 5]. This new commercial application, as well as other applications, such as high-resolution imaging and Earth and space monitoring [see Reference 1], significantly increases the need for agile and high precision satellites. In particular, the ability to perform rapid slew and settle maneuvers can have many advantages, such as, for example, increasing productivity or revenue (e.g., allowing the satellite to capture a larger number of images in a given period of time or to increase the number or duration of communication connections) and decreasing satellite power consumption (which can increase mission time). Thus, time-optimal (shortest-time) attitude control maneuvers are desirable.

Satellite attitude control systems commonly involve Eigen axis rotations. Eigen axis rotations are desirable as they are intuitively simple to construct and provide the advantage of reorienting the spacecraft along the shortest circular arc between the starting and desired final attitude angles. The angular error defined by translation from a first orientation to a second orientation can be represented as rotation through a certain angle about a particular fixed axis, referred to as the Eigen axis of the rotation. Once the Eigen axis has been determined, two other axes that need not be aligned with the reference spacecraft body fixed frame may be selected to form an orthogonal set with the Eigen axis. Since the entire rotation from the initial to the final states is performed about the Eigen axis, the other two axes will always have zero angles to be traversed. Eigen axis rotations are normally implemented as rest-to-rest maneuvers. That is, the rotation is initiated from rest and terminated when the spacecraft is again at rest in the new desired orientation. A maneuver similar to an Eigen axis rotation can be constructed when it is desired to initiate a reorientation maneuver from a non-resting state and/or when it is desired to terminate a reorientation maneuver at a non-resting state. For such non-rest maneuvers, rotations will normally be carried out as simultaneous rotations about three orthogonal axes and designed similarly to an Eigen axis maneuver according to the kinematic differential equations. In some satellite retargeting systems, fast retargeting and precision pointing are achieved by a combination of two different kinds of actuators, control moment gyros (CMGs) and reaction wheels (RWs). During slew, the CMGs are employed and the RWs are employed during settle and pointing.

CMGs present a unique challenge for performing satellite retargeting. In particular, unlike an array of reaction wheels, for which the torque capability is fixed with respect to the satellite frame, the torque capability of a CMG array varies continuously with the gimbal angles. Consequently, ensuring accurate torque production on the satellite requires proper configuration of the CMGs relative to one another, for example, to avoid gimbal configurations that result in singular states wherein torque cannot be produced in a certain direction. CMGs also have gimbal rate and input torque constraints that can be violated during the operation of the satellite, particularly if the satellite angular rates exceed predetermined limits, potentially leading to a loss of control of the satellite. Because of these complexities, devising a mechanism to ensure the predictability of shortest-time and other desired reorientations or maneuvers is an important aspect of the maneuver design problem for CMG-based satellite retargeting systems. Accordingly, improved methods and apparatus are needed for determining and implementing satellite retargeting maneuvers while maintaining operation within torque and other physical or operational limits.

During pointing, RWs may become ineffective as their spin rates reach the maximum rate. They require frequent momentum dumping, which effectively means reducing spin rates with additional actuators such as magnetic rods.

Furthermore, the use of separate CMG and RW actuators can make it difficult to meet strict size, weight, and power (SWaP) constraints that often exist for small satellites, especially where three or four sets of CMG and/or RW actuators are often used in order to control motion around multiple axes. As investigated in detail by Reference 1, such SWaP requirements can be met in many cases by miniaturized CMGs with integral variable speed flywheels (equivalently, RWs) capable of precisely controlled spinning. This type of CMG effectively combines typical CMG and RW actuators and is referred to herein as a "hybrid control moment gyroscope" or "HCMG."

The HCMG is a promising technology to enable rapid retargeting and precision pointing. However, it may suffer from old disadvantages inherited from the CMG and new disadvantages created by combining the CMG and RW. The former includes the well-known CMG gimbal singularity [see Reference 13], and the latter includes RW controllability. RW controllability is simply determined by the RW orientation. Typically, the RW orientation is fixed, but in the HCMG case, it varies and is determined by the gimbal angles.

The singularities related to the HCMG have been addressed by an extended singularity avoidance steering logic [see Reference 1, Reference 2, Reference 13]. Such singularity avoidance steering logic is an effective way to avoid the singularities but may not be an efficient way to enable rapid retargeting due to artificially inserted perturbation terms.

SUMMARY OF VARIOUS EMBODIMENTS

In accordance with one embodiment of the invention there is provided a satellite attitude control system for a satellite comprises four hybrid control moment gyroscopes arranged in a pyramid configuration, with each hybrid control moment gyroscope including a control moment gyroscope actuator and a reaction wheel actuator, and further comprises a retargeting controller for retargeting the satellite from an initial state through a desired slew and settle maneuver to a desired final state using path and endpoint constrained time-optimal control. The retargeting controller is configured to determine a set of gimbal angular rate vectors based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators and to produce retargeting commands for the hybrid control moment gyroscopes based on the set of gimbal angular rate vectors.

In various alternative embodiments, the gimbal angles of each hybrid control moment gyroscope k may be constrained by an endpoint constraint:

$$C_{LE} \leq |\sin(\delta_k(t_f))| \geq C_{UE}$$

where $C_{LE}$ is a lower bound and $C_{UE}$ is an upper bound. The gimbal angles at the end of the slew maneuver may be constrained to be between 10 and 20 degrees such that $C_{LE}=\sin(10°)$ and $C_{UE}=\sin(20°)$.

In further embodiments, the retargeting controller may include a PEC-TOC control problem formulator configured to formulate a control problem based on the initial state, the desired final state, and the predetermined set of path and endpoint constraints; a PEC-TOC control problem solver configured to solve the formulated control problem to determine the set of gimbal angular rate vectors; and a steering controller configured to produce the retargeting commands based on the set of gimbal angular rate vectors. The PEC-TOC control problem solver may include an embedded optimizer configured to use, as the initial state, either final state information from a prior control problem solution, a previous slew profile with similar beginning and ending conditions, or information from a lookup table that contains a set of pre-computed initialization states.

The retargeting controller may be further configured to determine a set of reaction wheel angular rate vectors for controlling flywheel spin rates of the reaction wheel actuators for performing momentum management during slew without the use of external actuators and to produce the retargeting commands based on the set of gimbal angular rate vectors and the set of reaction wheel angular rate vectors. The flywheel acceleration for each hybrid control moment gyroscope k may be formulated as a constraint on desired final flywheel spin rate and may be modeled as:

$$\dot{\Omega} = \frac{1}{\tau_{RW}}(u_{RW} - \Omega)$$

where $\tau_{RW}$ is the reaction wheel actuator motor time constant and $u_{RW}$ is the reaction wheel actuator acceleration.

In accordance with another embodiment of the invention there is provided a retargeting controller for retargeting a satellite from an initial state through a desired slew and settle maneuver to a desired final state using path and endpoint constrained time-optimal control. The satellite has four hybrid control moment gyroscopes arranged in a pyramid configuration, each hybrid control moment gyroscope including a control moment gyroscope actuator and a reaction wheel actuator. The retargeting controller comprises a PEC-TOC control problem formulator configured to formulate a control problem based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators; and a PEC-TOC control problem solver configured to solve the formulated control problem to determine a set of gimbal angular rate vectors for the hybrid control moment gyroscopes.

In various alternative embodiments, the retargeting controller may further comprise a steering controller configured to produce retargeting commands for the hybrid control moment gyroscopes based on the set of gimbal angular rate vectors. The PEC-TOC control problem solver may include an embedded optimizer configured to use, as the initial state, either final state information from a prior control problem solution, a previous slew profile with similar beginning and ending conditions, or information from a lookup table that contains a set of pre-computed initialization states. The gimbal angles of each hybrid control moment gyroscope k may be constrained by an endpoint constraint:

$$C_{LE} \leq |\sin(\delta_k(t_f))| \geq C_{UE}$$

where $C_{LE}$ is a lower bound and $C_{UE}$ is an upper bound. The gimbal angles at the end of the slew maneuver may be constrained to be between 10 and 20 degrees, in which case $C_{LE}=\sin(10°)$ and $C_{UE}=\sin(20°)$.

The retargeting controller may be further configured to determine a set of reaction wheel angular rate vectors for controlling flywheel spin rates of the reaction wheel actuators for performing momentum management during slew without the use of external actuators and to produce the retargeting commands based on the set of gimbal angular rate vectors and the set of reaction wheel angular rate vectors. The flywheel acceleration for each hybrid control moment gyroscope k may be formulated as a constraint on desired final flywheel spin rate and may be modeled as:

$$\dot{\Omega} = \frac{1}{\tau_{RW}}(u_{RW} - \Omega)$$

where $\tau_{RW}$ is the reaction wheel actuator motor time constant and $u_{RW}$ is the reaction wheel actuator acceleration.

In accordance with another embodiment of the invention there is provided a method for retargeting a satellite from an initial state through a desired slew and settle maneuver to a desired final state using path and endpoint constrained time-optimal control. The satellite has four hybrid control moment gyroscopes arranged in a pyramid configuration, each hybrid control moment gyroscope including a control moment gyroscope actuator and a reaction wheel actuator. The method involves using at least one processor to determine a set of gimbal angular rate vectors based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators. The method further involves producing retargeting commands for the hybrid control moment gyroscopes based on the set of gimbal angular rate vectors and providing the retargeting commands to the hybrid control moment gyroscopes.

In various alternative embodiments, determining the set of gimbal angular rate vectors may involve formulating a control problem based on the initial state, the desired final state, and the predetermined set of path and endpoint constraints; and solving the formulated control problem to determine the set of gimbal angular rate vectors. The gimbal angles of each hybrid control moment gyroscope k may be constrained by an endpoint constraint:

$$C_{LE} \leq |\sin(\delta_k(t_f))| \geq C_{UE}$$

where $C_{LE}$ is a lower bound and $C_{UE}$ is an upper bound. The gimbal angles at the end of the slew maneuver may be constrained to be between 10 and 20 degrees, in which case $C_{LE}=\sin(10°)$ and $C_{UE}=\sin(20°)$. Determining the set of gimbal angular rate vectors may involve using, as the initial state, final state information from a prior control problem solution; using, as the initial state, a previous slew profile with similar beginning and ending conditions; or using, as the initial state, information from a lookup table that contains a set of pre-computed initialization states.

Determining the set of gimbal angular rate vectors may involve determining a set of reaction wheel angular rate vectors for controlling flywheel spin rates of the reaction wheel actuators for performing momentum management during slew without the use of external actuators, and producing the retargeting commands for the hybrid control moment gyroscopes may involve producing the retargeting commands based on the set of gimbal angular rate vectors and the set of reaction wheel angular rate vectors. The flywheel acceleration for each hybrid control moment gyroscope k may be modeled as:

$$\dot{\Omega} = \frac{1}{\tau_{RW}}(u_{RW} - \Omega)$$

where $\tau$ is the reaction wheel actuator motor time constant and $u_{RW}$ is the reaction wheel actuator acceleration.

In certain embodiments, the gimbal angular rate vectors may be determined by at least one processor in the satellite, while in other embodiments, the gimbal angular rate vectors may be determined by a ground station and transmitted to the satellite.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
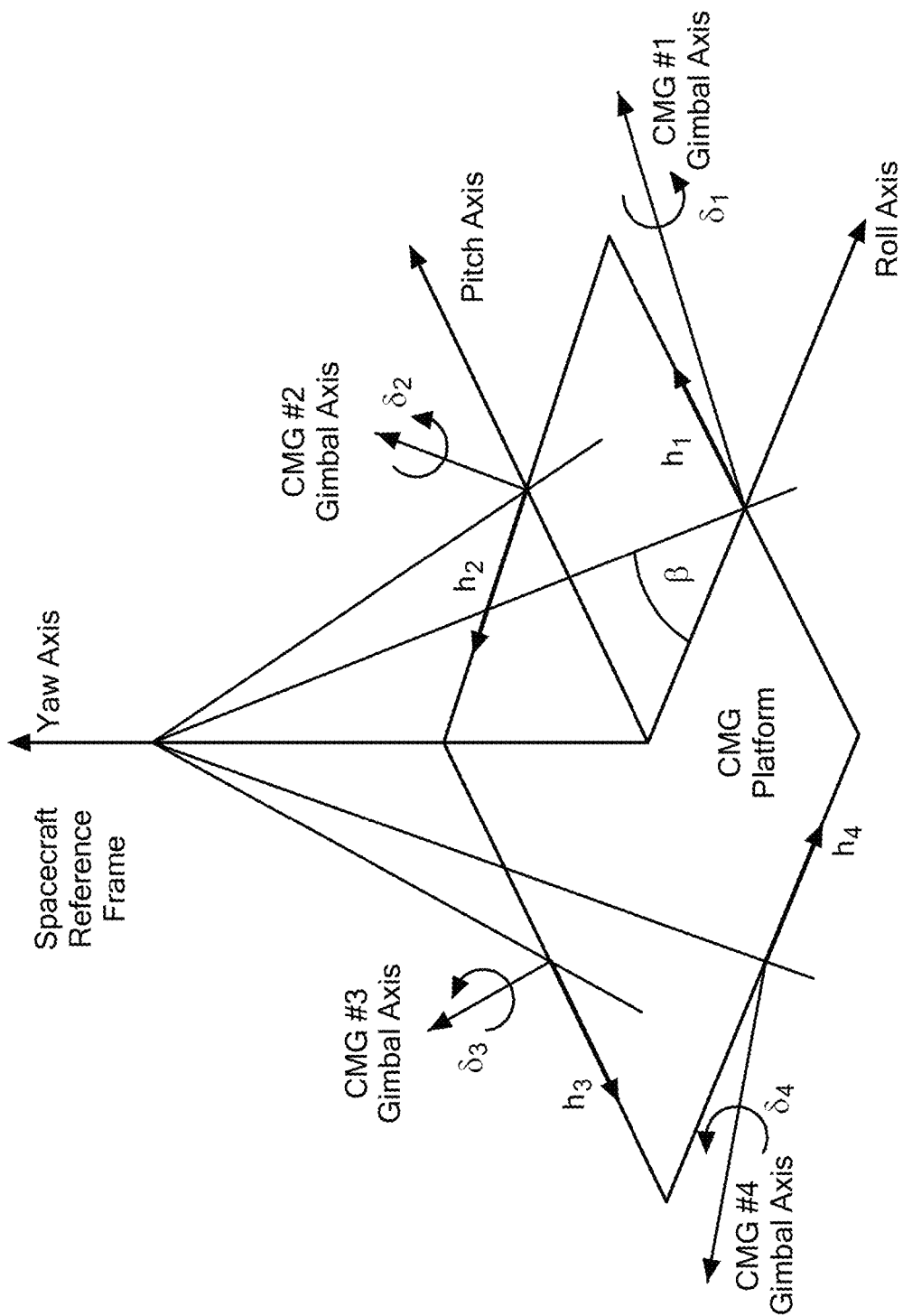
FIG. 1 is a schematic diagram showing an HCMG pyramid configuration in accordance with one exemplary embodiment.

Embodiments of the present invention provide satellite retargeting systems and methods for rapid retargeting of small satellites. For purposes of the following description and the accompanying claims, retargeting refers to the total settle time that completes a desired slew and regulates the pointing of a satellite within a few arc-minutes around the target location. As discussed above, rapid slew and settle is a critical element for many applications, such as, for example, low Earth orbit (LEO) laser communication in which the latency during slew should be minimized and precision pointing should be established as fast as possible after the slew.

Exemplary embodiments are based on the use of hybrid control moment gyroscopes (HCMGs) and a new path and endpoint constrained time-optimal control (PEC-TOC) solution that can be augmented with momentum management to perform momentum dumping during slew. The PEC-TOC solution with momentum management is directed to solving the problem of finding CMG optimal gimbal acceleration and RW optimal acceleration profiles that enable the fastest slew and momentum dumping while avoiding gimbal singularities and meeting the RW controllability constraint at the end of slew. As discussed above, in an HCMG, the RW orientation varies and is determined by the gimbal angles. The retargeting system ensures that the gimbal angles after completion of the slew are constrained such that the RWs are oriented to provide sufficient torque authority for enabling fast settle and precision pointing. The retargeting system also ensures that the RW spin rate is reduced to meet the desired magnitude during slew and settle.

Due to frequent retargeting of LEO satellites, momentum dumping during slew is practical and effective and can eliminate the need for additional actuator(s) and a special mission mode for momentum dumping during tracking. Among other things, reducing the number of actuators can reduce power consumption and therefore can enable longer missions. Intuitively, the momentum dumping formulation may be considered as a negative factor that would increase the slew and settle time of the PEC-TOC solution. Surprisingly, however, an exemplary embodiment reveals that momentum dumping actually reduces the slew and settle time. The inventors suspect that the shorter slew and settle time is achieved by reducing the total angular momentum of the satellite due to slower spin-rates of the flywheels. A slew profile effectively accelerates rotation of satellite during the first half of slew and then decelerates it during the second half. As the total angular momentum of satellite is reduced, the deceleration process is shortened.

Also disclosed herein is an embedded optimizer that solves the PEC-TOC problem and optionally also the momentum management problem in real-time. The PEC-TOC slew and settle problems are highly nonlinear optimization problems. The embedded optimizer solves the optimal control problem in a sequential way, e.g., by initializing the current optimization process using the previous optimal solution or a previous slew profile with similar beginning and ending conditions, or by initializing the current optimization process using a lookup table that contains a set of pre-computed initialization states. The initialization is possible because all important states at both beginning and end of slew are constrained to user-defined specific values and slews can be repeatable. After initialization, the optimization solves a new trajectory at every time step (for example, 0.1 seconds) during slew. Due to continuity in the nature of the optimal problem and its solution, the sequential process typically requires at most only a few iterations to reach the optimal solution during each step and is suitable for real-time optimization.

Potential benefits of this new approach for rapid slew and settle and momentum management during slew are presented with comparison to the eigenaxis method with generalized robust steering logic for a single simulation case.

Hybrid Control Moment Gyroscope Configuration

In exemplary embodiments of the invention, the retargeting system includes four single degree-of-freedom (DOF) HCMGs arranged in a pyramid configuration as is popularly chosen in many applications [see References 1 and 2]. The four HCMGs effectively combine four CMGs and four RWs to meet the strict size, weight and power (SWaP) requirements of small satellites. Three HCMGs are the minimal set for full three-axis torque capability. However, the fourth HCMG provides an extra degree-of-freedom (DOF) that enables CMG singularity avoidance while executing an efficient slew. This extra DOF also facilitates momentum management during slew.

Various exemplary embodiments are described with reference to the HCMG pyramid configuration shown in FIG. 1, which defines various parameters associated with the four HCMGs (referred to in FIG. 1 as CMGs 1, 2, 3, 4) relative to the roll, pitch, and yaw axes of the satellite.

The angular momentum of each HCMG k (where k=1, 2, 3, 4) can be represented by the following matrix:

$$H_{HCMG} = \Sigma B_k (I_{RW} \Omega_k) \quad (1)$$

Where $I_{RW}$ is the reaction wheel inertia of the kth reaction wheel and $\Omega_k$ is the angular rate of the kth reaction wheel, and where:

$$B_k = \begin{bmatrix} -\cos(\theta)_k \cos\phi_k \sin\delta_k - \sin\phi_k \cos\delta_k \\ -\cos(\theta)_k \sin\phi_k \sin\delta_k + \cos\phi_k \cos\delta_k \\ \sin\theta_k \sin\delta_k \end{bmatrix} \quad (2)$$

Each HCMG can generate RW-type torque and CMG-type torque. The RW torque component can be represented as:

$$T_{RW} = \Sigma B_k (I_{RW} \dot{\Omega}_k) \quad (3)$$

The CMG torque component can be represented as:

$$T_{CMG} = \Sigma A_k (I_{RW} \Omega_k) \dot{\delta}_k \quad (4)$$

where:

$$A_k = \frac{\partial B_k}{\partial \delta_k} \text{ or:} \quad (5)$$

-continued $$A_k = \begin{bmatrix} -\cos(\theta)_k \cos\phi_k \cos\delta_k + \sin\phi_k \sin\delta_k \\ -\cos(\theta)_k \sin\phi_k \cos\delta_k - \cos\phi_k \sin\delta_k \\ \sin\theta_k \cos\delta_k \end{bmatrix}$$

The A and B matrices consist of 4 $A_k$ column vectors and 4 $B_k$ column vectors, respectively, where k=1,2,3,4 and refers to the HCMG. These matrices carry important measures for CMG and RW singularities [see Reference 1]. In particular, CMG singularities are defined by det(A*A')=0, and RW singularities are defined by det(B*B')=0.

As described in Reference 1, the CMG has two types of singular states [see also Reference 2], namely hyperbolic and elliptic singular states. It is possible to escape from hyperbolic singular states but not from elliptic singular states. The fourth HCMG provides for null motion that enables either escaping the hyperbolic singular state or avoiding entering the elliptic singular state without deforming the slew profile. Furthermore, it provides for flexibility to incorporate moment management as discussed below. It can be explained with a simple equation. Consider momentum dumping of the RW with CMG actuation. As shown in Equation (6), momentum dumping is enabled by changing gimbal angles, conserving total HCMG angular momentum such that $T_{CMG}$ from Equation (4)+$T_{RW}$ from Equation (3)=0.

$$\dot{H}_{HCMG} = 0 = \Sigma A_k (I_{RW} \Omega_k) \dot{\delta}_k + \Sigma B_k (I_{RW} \dot{\Omega}_k) \quad (6)$$

Equation (6) has two outputs to be solved, specifically the gimbal angular rate command for the kth HCMG $\dot{\delta}_k$ and the flywheel spin rate for the kth reaction wheel $\dot{\Omega}_k$. Specifically, Equation (6) is used to find $\dot{\delta}_k$ (gimbal rate) that controls $\dot{\Omega}_k$ (reaction wheel spin rate) to a desired magnitude. The general goal is to control gimbal angle to optimize performance of the RW torque.

Equation (6) shows a direct linear mapping between gimbal rate and spin acceleration. They are directly mapped via either the inverse of the A matrix or the inverse of the B matrix. When either the CMG or RW is in a singular state, the inverse of A or B, respectively, does not exist, and thus finding the mapping would be difficult. In other words, an efficient momentum dumping strategy would be difficult to find. The fourth HCMG provides an extra DOF to facilitate singularity escape and avoidance, which ensures that the A and B matrices are full-rank, and thus the momentum dumping strategy is determined by the computationally efficient pseudo-inverse.

Figure 2:
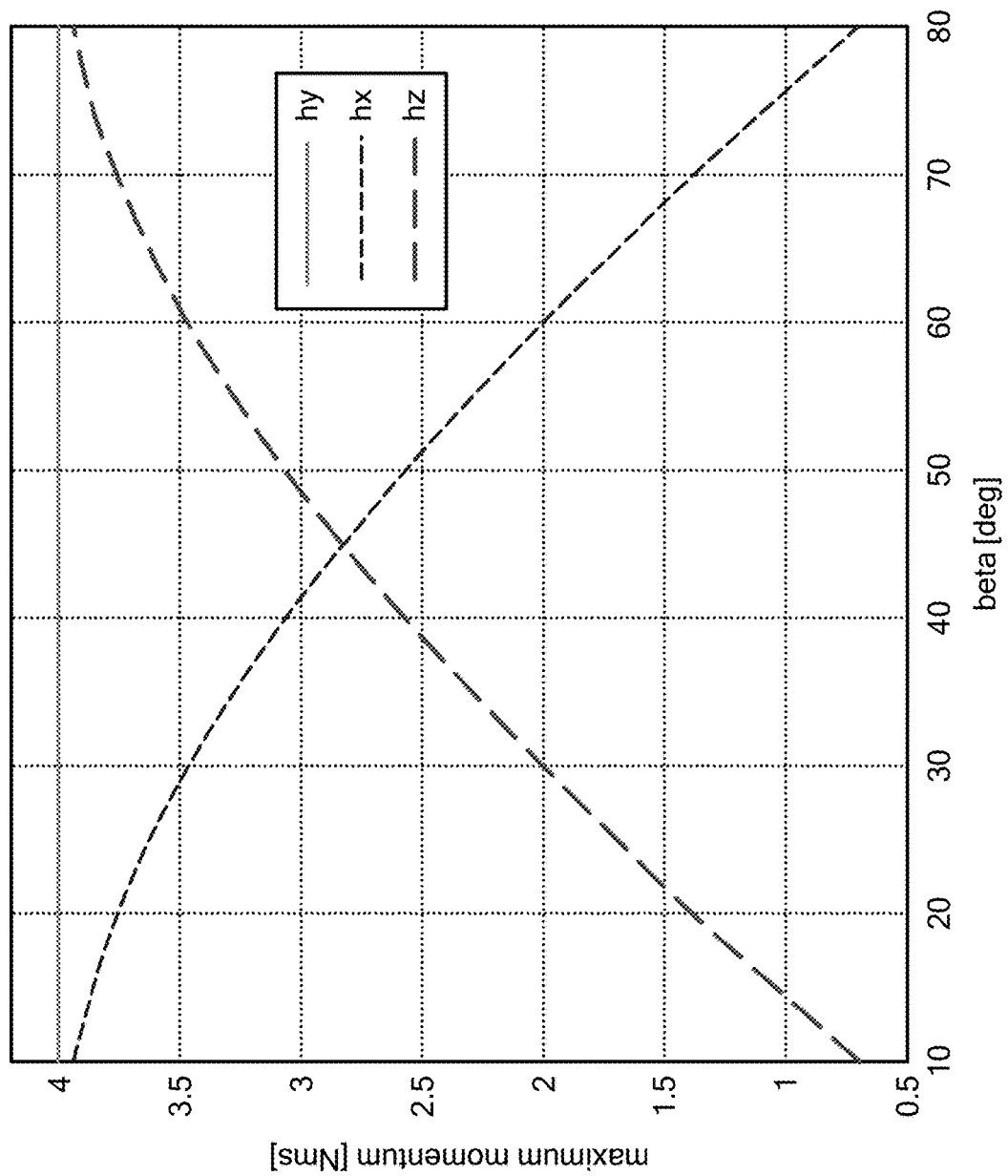
FIG. 2 is a graph showing the relationship between HCMG pyramid angle and maximum momentum in accordance with one exemplary embodiment.

Another important consideration is the pyramid angle. As shown in FIG. 2, the maximum possible momentum of the HCMG is calculated as a function of the pyramid angle, beta. Typically, the payload bore-sight axis is aligned to the yaw axis, or z-axis, and the satellite yaw-axis has the smallest moment of inertia. For settle and pointing, it may be desirable to have larger maximum angular momentums about the x-axis and y-axis relative to the z-axis; however, in embodiments of the present invention, the pyramid angle is not selected to satisfy this condition. As discussed below, the PEC-TOC slew profile tends to utilize the maximum torque capability about all three axes. To allow for a more even distribution of maximum possible HCMG momentum about the satellite body axes, exemplary embodiments use a pyramid angle of 54.74 degrees, which also is widely used in the literature [see Reference 2], although alternative embodiments may use other pyramid angles (e.g., a pyramid angle of around 20 degrees).

PEC-TOC Formulation

As discussed above, the goal of PEC-TOC is to find the state and control that minimizes the total slew and settle time. Thus, the solver must minimize the cost functional:

$$J = t_f \tag{7}$$

When using this direct time-optimal control cost functional, simulations of the solver discussed herein converged to locally time-optimal gimbal and satellite trajectories that were undesirable due to chatter. In exemplary embodiments of the present invention, this chatter is avoided by using a hybrid, weighted objective function that also includes a total energy term, as follows:

$$J = c_1 t_f + c_2 \int_{t_0}^{t_f} u(\tau)^T u(\tau) d\tau \tag{8}$$

where $u = [u_{CMG}; u_{RW}]$, a collection of CMG gimbal acceleration (equivalently, gimbal torque divided by gimbal moment of inertia) and RW flywheel acceleration (equivalently, RW torque divided by RW moment of inertia). Without momentum management, $u = u_{CMG}$ only, but with momentum management, $u = [u_{CMG}; u_{RW}]$.

By making $c_1$ much greater than $c_2$, the solution will still be locally time-optimal, and importantly, the satellite angular rate, satellite attitude, gimbal angle, and gimbal angle rate trajectories will be smooth.

For purposes of this discussion, the satellite is assumed to be rigid, stationary in space, and subject to no environmental disturbances. The HCMGs are the only actuators. The attitude dynamics are then described by Euler's equation:

$$\dot{\omega}_B = J_B^{-1}[-\omega_B \times (J_B \omega_B + \Sigma B(\delta) H_{RW}) - T_{CMG} - T_{RW}] \tag{9}$$

where $J_B$ is the 3×3 satellite inertia matrix resolved in the satellite body frame, $\omega_B$ is the satellite angular velocity resolved in the satellite body frame, $B(\delta)$ maps the flywheel momentum to a torque in the body frame, $T_{CMG}$ is the CMG torque from Equation (4), $T_{RW}$ is the RW torque from Equation (3), and $H_{RW}$ is the angular momentum of the RWs, defined as the 4×4 diagonal matrix:

$$H_{RW} = \text{diag}(I_{RW} \Omega_k) \tag{10}$$

where $I_{RW}$ is the reaction wheel inertia of the kth reaction wheel and $\Omega_k$ is the angular rate of the kth reaction wheel.

It should be noted that momentum management is not included in this formulation. In particular, $\Omega_k$ is assumed to be constant, and therefore $T_{RW}$ and $u_{RW}$ are zero. Momentum management is addressed separately below.

The attitude of the satellite is expressed using the quaternion of the satellite body frame relative to the inertial frame. The quaternion kinematics are:

$$\dot{q}_{b2i} = \frac{1}{2}(\omega_B) q_{b2i} \tag{11}$$

where $Q(\omega_B)$ is the matrix:

$$Q(\omega_B) = \begin{bmatrix} 0 & \omega_{B,x} & \omega_{B,y} & \omega_{B,z} \\ -\omega_{B,x} & 0 & \omega_{B,z} & -\omega_{B,y} \\ -\omega_{B,y} & -\omega_{B,z} & 0 & \omega_{B,x} \\ -\omega_{B,z} & \omega_{B,y} & -\omega_{B,x} & 0 \end{bmatrix} \tag{12}$$

The gimbal states are modeled as first order dynamics. The main objective is not modeling the gimbal dynamics, but finding smooth gimbal angle and gimbal angle rate trajectories that result in time-optimal slew and settle. The gimbal acceleration for each HCMG k is modeled as:

$$\ddot{\delta} = \frac{1}{\tau_{CMG}}(u_{CMG} - \dot{\delta}) \tag{13}$$

where $\tau$ is the gimbal motor time constant and $u_{CMG}$ is the CMG gimbal acceleration discussed above with reference to Equation (8).

For performing momentum management during slew as discussed below, the flywheel acceleration for each HCMG k is modeled as:

$$\dot{\Omega} = \frac{1}{\tau_{RW}}(u_{RW} - \Omega) \tag{14}$$

where $\tau_{RW}$ is the RW motor time constant and $u_{RW}$ is the RW flywheel acceleration discussed above with reference to Equation (8). Equation (14) is not used for PEC-TOC without momentum management, where $\dot{\Omega}$ is assumed to be constant.

It is well known that CMGs can enter singular configurations in which the desired torque cannot be generated. To avoid solving for trajectories that would cause the HCMGs to enter singular configurations, embodiments of the present invention impose a path constraint during the slew and settle maneuver. As described earlier, the CMG singular states occur when $\det(A^*A^T) = 0$. Therefore, in one exemplary embodiment, CMG singularity is avoided using the path constraint formulated as:

$$\det(A(\delta)A(\delta)^T) \geq C_A \tag{15}$$

where $C_A$ is a constant lower bound.

In this exemplary embodiment, RW singularity is avoided using the path constraint formulated as:

$$\det(B(\delta(t_f))B(\delta(t_f))^T) \geq C_B \tag{16}$$

where $C_B$ is a constant lower bound. In exemplary embodiments, the RW singularity is effectively constrained as an endpoint constraint because the RW will not be used during slew due to the relatively small torque capacity.

In embodiments of the present invention, the gimbal angle at the endpoint is further constrained. This constraint aims to ensure that the slew is completed with the HCMGs in a final orientation that is able to generate the torques required for settle and precision pointing in RW mode. Assuming the payload is located along the z-axis of the satellite body frame, the torques for precision pointing will be about the x and y axes. By ensuring that the gimbal angles at the end of the slew are within a predetermined range, the torque that can be generated about the x and y axes will be significantly larger than the maximum torque that can be generated about the z-axis. Thus, in this exemplary embodiment, the endpoint constraint on the gimbal angles is:

$$C_{LE} \leq |\sin(\delta_k(t_f))| \geq C_{UE} \tag{17}$$

where $C_{LE}$ is a lower bound and $C_{UE}$ is an upper bound.

In one exemplary embodiment simulated below, the gimbal angles at the end of the slew are ensured to be between 10 and 20 degrees, which in this exemplary embodiment allows the maximum torque that can be generated about the x and y axes to be at least twice as large as the maximum torque that can be generated about the z-axis. Thus, in this exemplary embodiment, $C_{LE} = \sin(10°)$ and $C_{UE} = \sin(20°)$.

In certain exemplary embodiments, the momentum dumping condition is uniquely formulated as desired initial and final spin-rates of the flywheels using Equation (14) and solving for $u_{RW}$ (with $\tau_{RW}$ being non-zero), as opposed to using constant maximum RW torques for momentum dumping, which was found to create numerical difficulties in solving the equation.

PEC-TOC Controller (Solver)

PEC-TOC slew trajectory optimization was simulated using GPOPS-II (GPOPS), a powerful MATLAB™ optimal control software used to solve nonlinear optimal control problems [see References 3 and 4] and SNOPT, a sequential quadratic programming (SQP) algorithm [see Reference 6]. GPOPS and SNOPT have been proven to be efficient tools for solving this kind of problem [see Reference 7]. GPOPS uses the pseudospectral method with Legendre-Gauss-Radau collocation points to transcribe the optimal control problem into a nonlinear programming (NLP) problem [see Reference 4]. The NLP problem was then solved using SNOPT, in which the search direction was obtained from a quadratic programming (QP) sub-problem that minimizes a quadratic model of the Lagrangian function subject to linearized constraints [see Reference 6]. The combination of GPOPS and SNOPT reliably and efficiently optimize constrained nonlinear problems subject to bounds on states, controls, and constraints. With proper scale factors and an appropriate number of collocation points, GPOPS and SNOPT are able to find local minima within a reasonable computation time.

GPOPS breaks the state trajectories into segments that are approximated by polynomials and are joined at collocation points. The number of collocation points used to generate the optimal solution can affect the speed of convergence as well as the fidelity of the solution. In general, by using more collocation points with a fixed number of mesh intervals, speed of convergence is sacrificed for fidelity, and vice-versa. As the number of collocation points is increased, the number of boundary conditions that must be met and the number of polynomial approximations increase, increasing calculations and becoming computationally expensive for problems with many states. Using the slew discussed herein, simulations were performed on how the number of mesh intervals and the number of collocation points per mesh interval affect convergence and fidelity.

Figure 3:
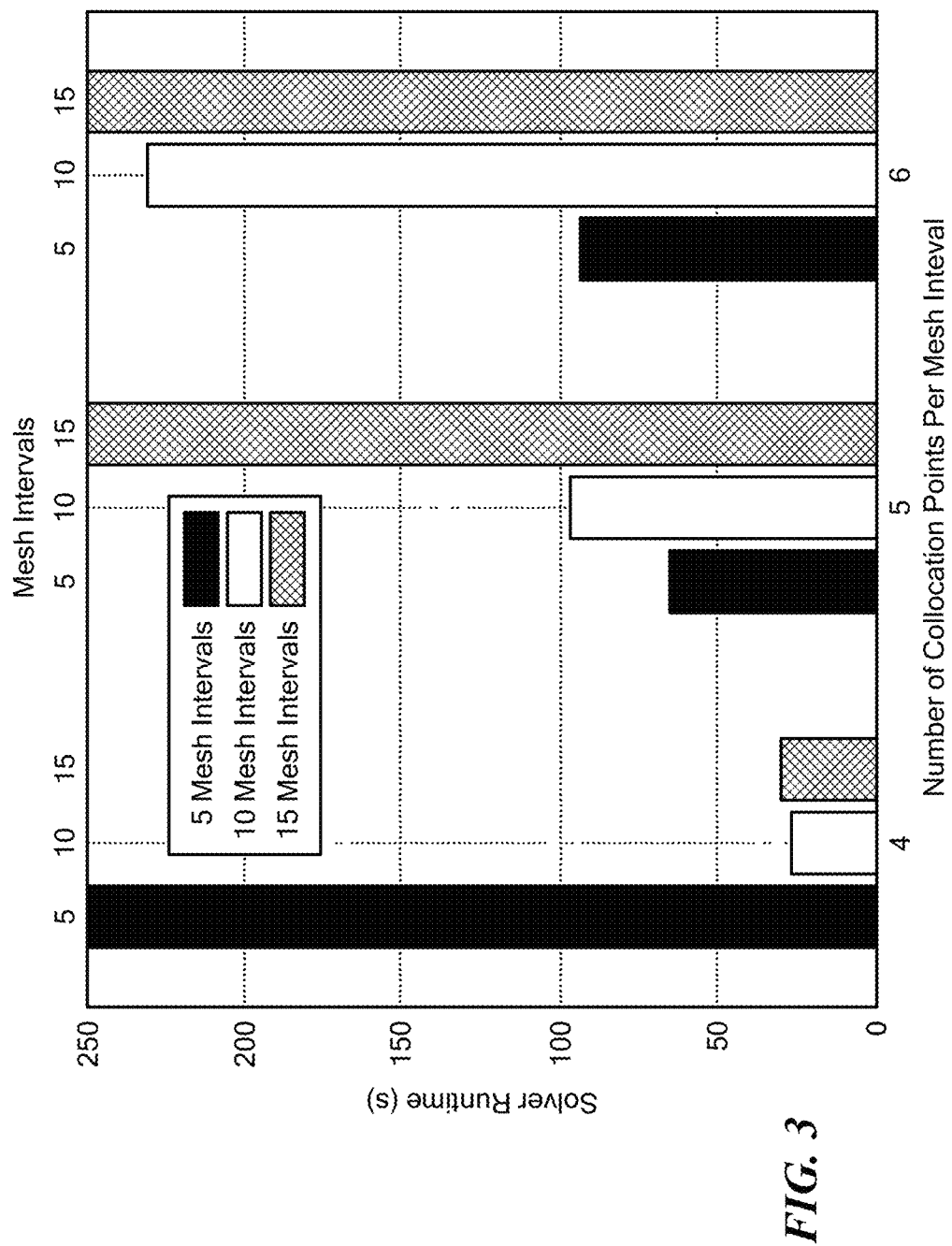
FIG. 3 is a graph showing the relationship between the number of mesh intervals, the number of collocation points per mesh interval, and the solver run time, in accordance with one exemplary embodiment.

FIG. 3 is a graph showing the relationship between the number of mesh intervals, the number of collocation points per mesh interval, and the solver run time, in accordance with one exemplary embodiment. As shown, the number of mesh intervals and the number of collocation points per mesh interval can have a large effect on the total solver runtime. For example, when there were four collocation points per mesh interval and five mesh intervals, the solver ran for almost 20 minutes before finding a feasible solution. Similarly, the solver runtime was found to be excessive when there were too many collocation points.

Figure 4:
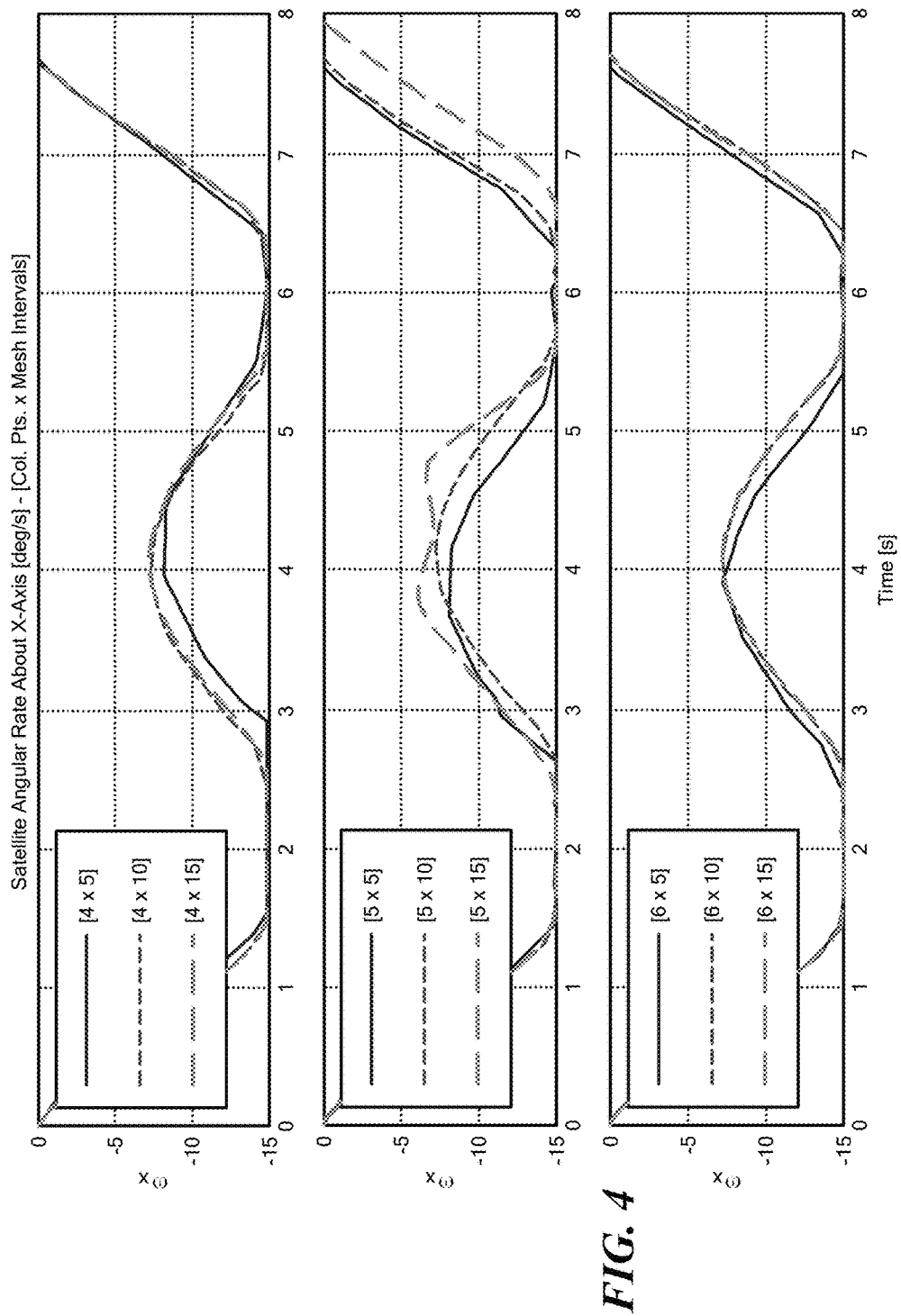
FIG. 4 is a graph showing the relationship between the number of mesh intervals, the number of collation points per mesh interval, and the fidelity of the solution, in accordance with one exemplary embodiment.

FIG. 4 is a graph showing the relationship between the number of mesh intervals, the number of collation points per mesh interval, and the fidelity of the solution, in accordance with one exemplary embodiment. Only the satellite angular rate about the x-axis is shown here, but similar results were obtained for all satellite and gimbal states. Cases with fewer than 4 major collocation points, although fast, resulted in choppy results, and cases with more than 6 collocation points took too long to converge and showed negligible fidelity improvements. Therefore, for the solver results discussed below, the solver results were generated using six collocation points and ten equally spaced mesh intervals.

Scaling is another factor that is important in speed of convergence because, with proper scaling, all states are of the same order of magnitude, which makes the solver step size selection more efficient. For the solver results discussed below, most scale factors were set using the upper bound on the state variable, and the time scale factor was set based on expected slew time. This ensured that all states and time were the same order of magnitude.

Table 1 shows the GPOPS Scale Factors used for the solver results discussed below.

TABLE 1

GPOPS Scale Factors

| Parameter | Value | Units |
|---|---|---|
| SF_time | 7.7 | seconds |
| SF_omega | 0.2618 | radians |
| SF_delta | 2.618 | radians |
| SF_deltarate | 1.0472 | radians/second |
| SF_u | 1.0472 | radians/second |
| SF_spinrate | 50 | radians/second |

A third factor affecting convergence speed, as well as the overall solution, is the bounds set on the states, control, and time. Tighter bounds result in a smaller search space, which can lead to faster convergence. However, if the bounds are too tight, the problem may be infeasible, which can increase total solver time as the solver tries to find a feasible solution within the bounds. Thus, for real-time implementation, it is important to have a good initial guess with which to seed the solver.

The endpoint constraints on the gimbal angles, as well as momentum management discussed later, facilitate the selection of a good initial guess, which in turn leads to fast optimization. These constraints make HCMG initial and final states predictable. For rapid slew and settle, the satellite initial and final angular rate and orientation are also known. The only unknowns for which a guess must be provided are total slew time and value of the integral term in the cost functional, which both can be approximated using eigenaxis slew results and can be pre-computed because the initial and final conditions of slew and settle are deterministic.

Simulation

The PEC-TOC solutions were computed and then implemented in a simulation model for comparison. They were used as feedforward commands. Thus, a simple PID-type feedback controller was employed to achieve reasonable closed-loop responses. The result was compared to a benchmark approach of using eigenaxis slew. Also considered was the case of the PEC-TOC formulation with the endpoint constraint removed (referred to herein as Path Constrained Time-Optimal Control or PC-TOC). This case highlights the improvements caused by the endpoint constraints in the PEC-TOC formulation.

All three simulations used the same parameters as listed in Table 2. As shown, the simulations used path constraints $C_A=0.2$ and $C_B=0.6$ for Equations (15) and (16), respectively. The simulations also used the endpoint constraint shown in Equation (17). A gain scheduled PID controller was used to convert attitude and angular rate errors into a delta torque that is added to the torque command. The time used for comparison was chosen as the time required for the line-of-sight (LOS) error to settle below 10 arc-minutes. For simulation purposes, perfect sensors and actuators were assumed. The chaser and target spacecraft were assumed to be stationary, which is reasonable given the small slew time.

TABLE 2

Simulation Parameters

| Parameter | Value | Units |
|---|---|---|
| $J_B$ | $\begin{bmatrix} 0.3 & 0 & 0 \\ 0 & 0.3 & 0 \\ 0 & 0 & 0.3 \end{bmatrix}$ | $kgm^2$ |
| $\theta$ | 20 | degrees |
| $\phi$ | $[0, 90, 180, 270]^T$ | degrees |
| $q_{i2b,0}$ | $[\sin(45), 0, 0, \cos(45)]^T$ | |
| $q_{i2b,f}$ | $[0.5, 0.5, -0.5, 0.5]T$ | |
| $\omega_0$ | $[0, 0, 0]^T$ | degrees/s |
| $\omega_f$ | $[0, 0, 0]^T$ | degrees/s |
| $\tau$ | 0.5 | |
| $C_A$ | 0.2 | |
| $C_B$ | 0.6 | |
| $\delta_0$ | $[0, 0, 0, 0]^T$ | degrees |
| $\delta_{dot,0}$ | $[0, 0, 0, 0]^T$ | degrees/s |
| $\Omega_0$ | 12000 | RPM |
| $I_x$ | 3.2e−5 | $kgm^2$ |
| $\lambda_0$ | 1e−9 | |
| M | −10 | |
| $\phi_1$ | 0.25 | |
| $\phi_2$ | 0.13 | |
| $\phi_3$ | 0.05 | |

For this example, the PEC-TOC and eigenaxis slews required different gains for best performance, although it should be noted that the gains were not optimized. Table 3 lists controller parameters used for the PEC-TOC and PC-TOC maneuver simulations. Table 4 lists controller parameters for the eigenaxis maneuver simulation.

TABLE 3

PEC-TOC Controller Parameters

| Parameter | Value |
|---|---|
| $k_{1,1}$ | 0.3142 |
| $k_{2,1}$ | 0 |
| $k_{3,1}$ | 0.95 |
| $k_{1,2}$ | $k_{1,1}$ |
| $k_{2,2}$ | 0.0493 |
| $k_{3,2}$ | $k_{3,1}$ |
| $k_{1,3}$ | $2k_{1,1}$ |
| $k_{2,3}$ | $2k_{2,2}$ |
| $k_{3,3}$ | $k_{3,1}$ |

TABLE 4

Eigenaxis slew Controller Parameters

| Parameter | Value |
|---|---|
| $k_{1,1}$ | 0.6284 |
| $k_{2,1}$ | 0 |
| $k_{3,1}$ | 0.93 |
| $k_{1,2}$ | $4k_{1,1}$ |
| $k_{2,2}$ | 0.0493 |
| $k_{3,2}$ | $k_{3,1}$ |
| $k_{1,3}$ | $9.5k_{1,1}$ |
| $k_{2,3}$ | $2k_{2,2}$ |
| $k_{3,3}$ | $k_{3,1}$ |

The first set, $k_{i,1}$, was used until the LOS error was less than 20 degrees. The second set, $k_{i,2}$, was used when the LOS error was less than 20 degrees but greater than or equal to two degrees. The third set, $k_{i,3}$, was used when the LOS error was less than two degrees.

The controller parameters were used in the following equation:

$$\Delta\tau_{HCMG} = I_B[k_1^2 \epsilon_q + k_2 \int \epsilon_q + 2k_1 k_3 \epsilon_\omega] \quad (18)$$

where $\epsilon_q$ is the attitude error, $\epsilon_\omega$ is the rate error, $\Delta\tau_{HCMG}$ is the torque that must be applied to the satellite to correct for state errors, $k_1$ is the bandwidth, $k_2$ is the integral gain, and $k_3$ is the damping.

To simulate the PEC-TOC and PC-TOC formulations, the GPOPS satellite quaternion, angular rate, and gimbal rate trajectories were used as feed-forward commands. The simulation was run at 20 Hz, so the GPOPS output was interpolated to obtain values at simulation time steps.

To simulate the eigenaxis slew, generalized singularity robust steering logic was implemented to escape and avoid singular configurations [see References 1 and 2]. As shown in Equations (19)-(22) below, a weighted matrix λE perturbs the commanded control torque vector such that it is never pointing in a singular direction and ensures the inverse always exists.

The gimbal rate command is calculated as:

$$\dot{\delta}_{cmd} = H_{RW}^{-1} A^\# (H_{CMG,cmd} - (\omega_B \times H_{CMG})) \quad (19)$$

where:

$$A^\# = A^T[AA^T + \lambda E]^{-1} \quad (20)$$

$$\lambda = \lambda_0 \exp(-\mu \det(AA^T)) \quad (21)$$

$$E = \begin{bmatrix} 1 & \varepsilon_0 \sin(t+\phi_1) & \varepsilon_0 \sin(t+\phi_2) \\ \varepsilon_0 \sin(t+\phi_1) & 1 & \varepsilon_0 \sin(t+\phi_3) \\ \varepsilon_0 \sin(t+\phi_2) & \varepsilon_0 \sin(t+\phi_3) & 1 \end{bmatrix} \quad (22)$$

The solver results used in this simulation for the PEC-TOC solution are shown in FIGS. 5-9.

Figure 5:
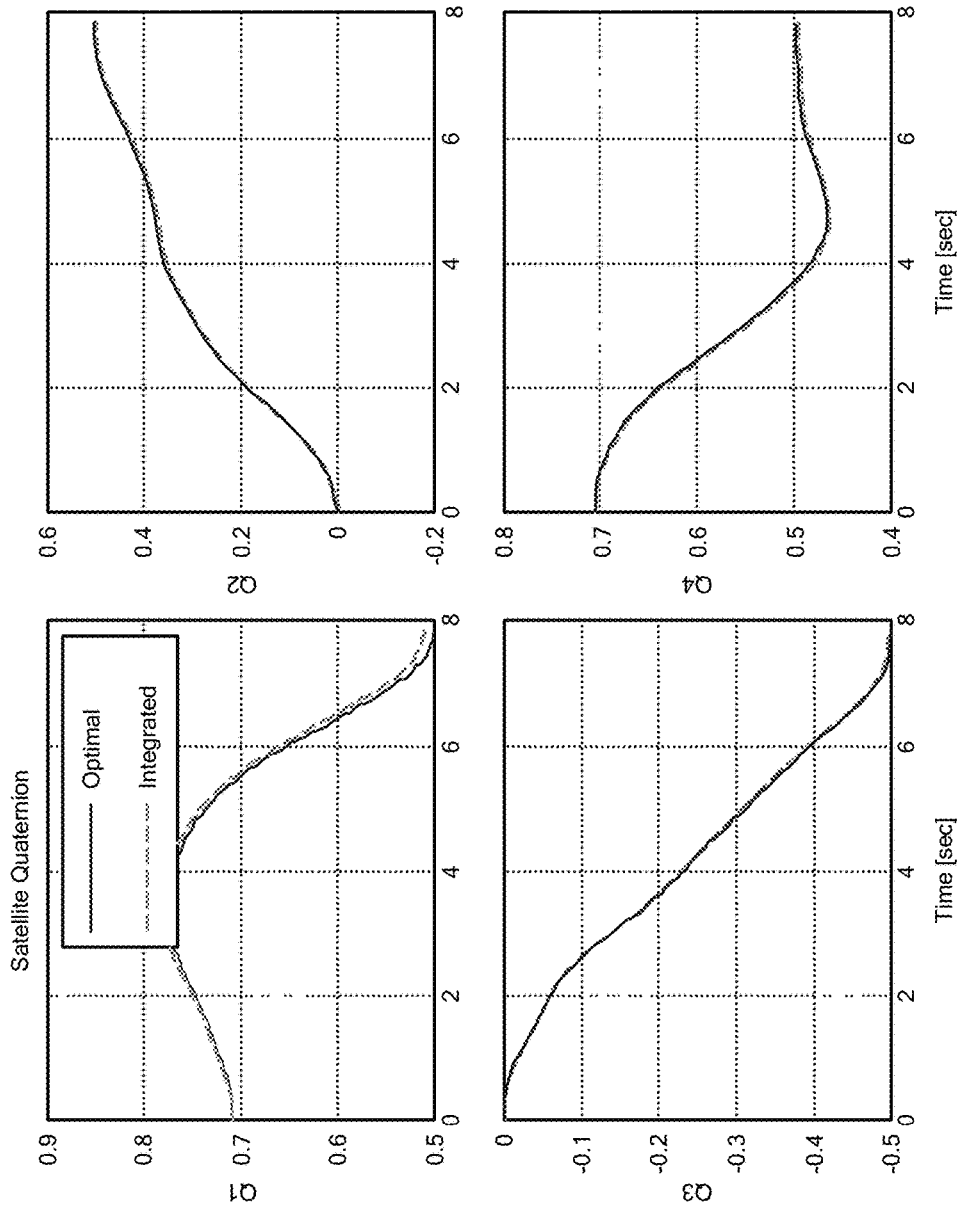
FIG. 5 shows GPOPS Optimized Satellite Quaternion Trajectory, in accordance with one exemplary embodiment.

FIG. 5 shows GPOPS Optimized Satellite Quaternion Trajectory, in accordance with one exemplary embodiment. In FIG. 5, the optimal line is the GPOPS result, and the integrated line was created by using the GPOPS solution in a simple open loop simulation.

Figure 6:
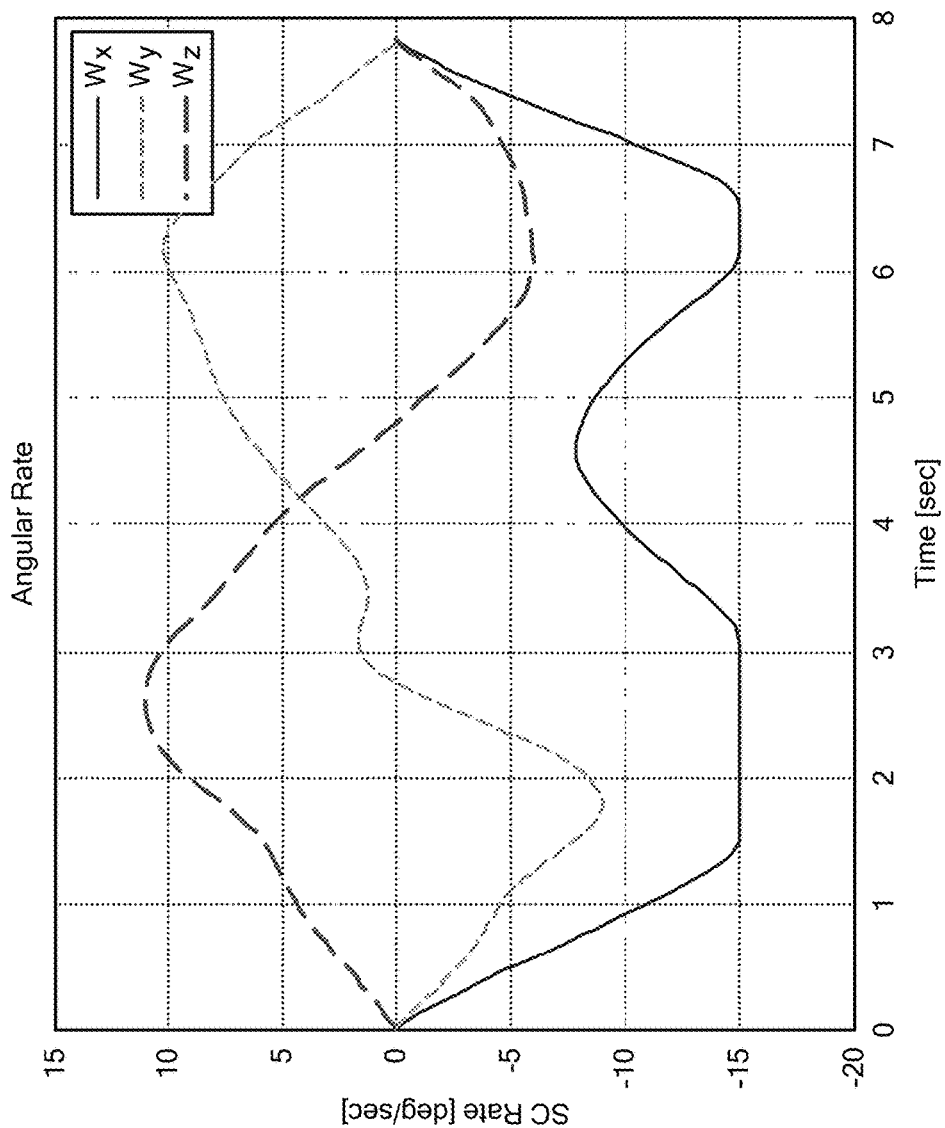
FIG. 6 shows GPOPS Optimized Satellite Angular Rate Trajectory, in accordance with one exemplary embodiment.

FIG. 6 shows GPOPS Optimized Satellite Angular Rate Trajectory, in accordance with one exemplary embodiment.

Figure 7:
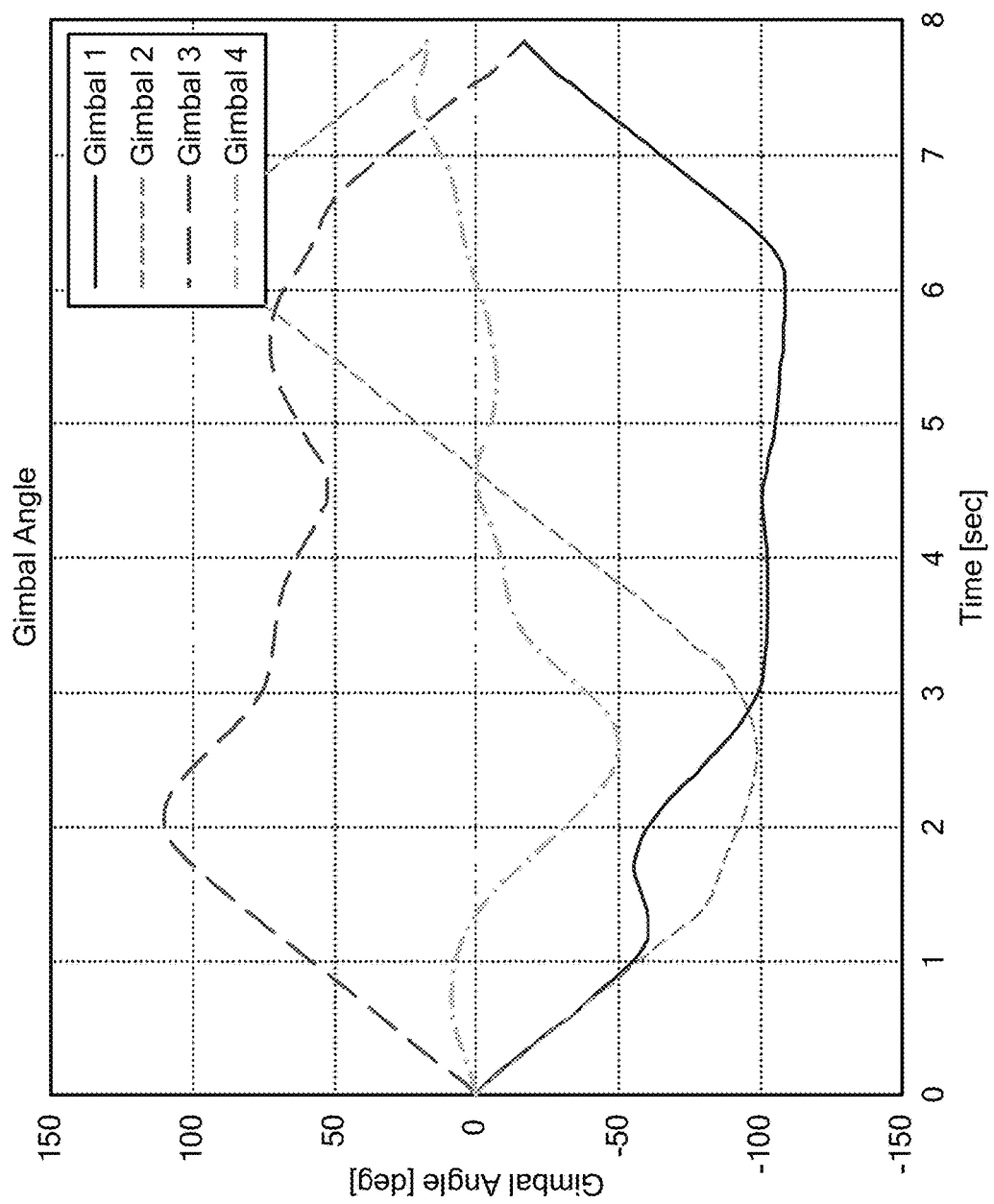
FIG. 7 shows GPOPS Optimized Gimbal Angle Trajectory, in accordance with one exemplary embodiment.

FIG. 7 shows GPOPS Optimized Gimbal Angle Trajectory, in accordance with one exemplary embodiment.

Figure 8:
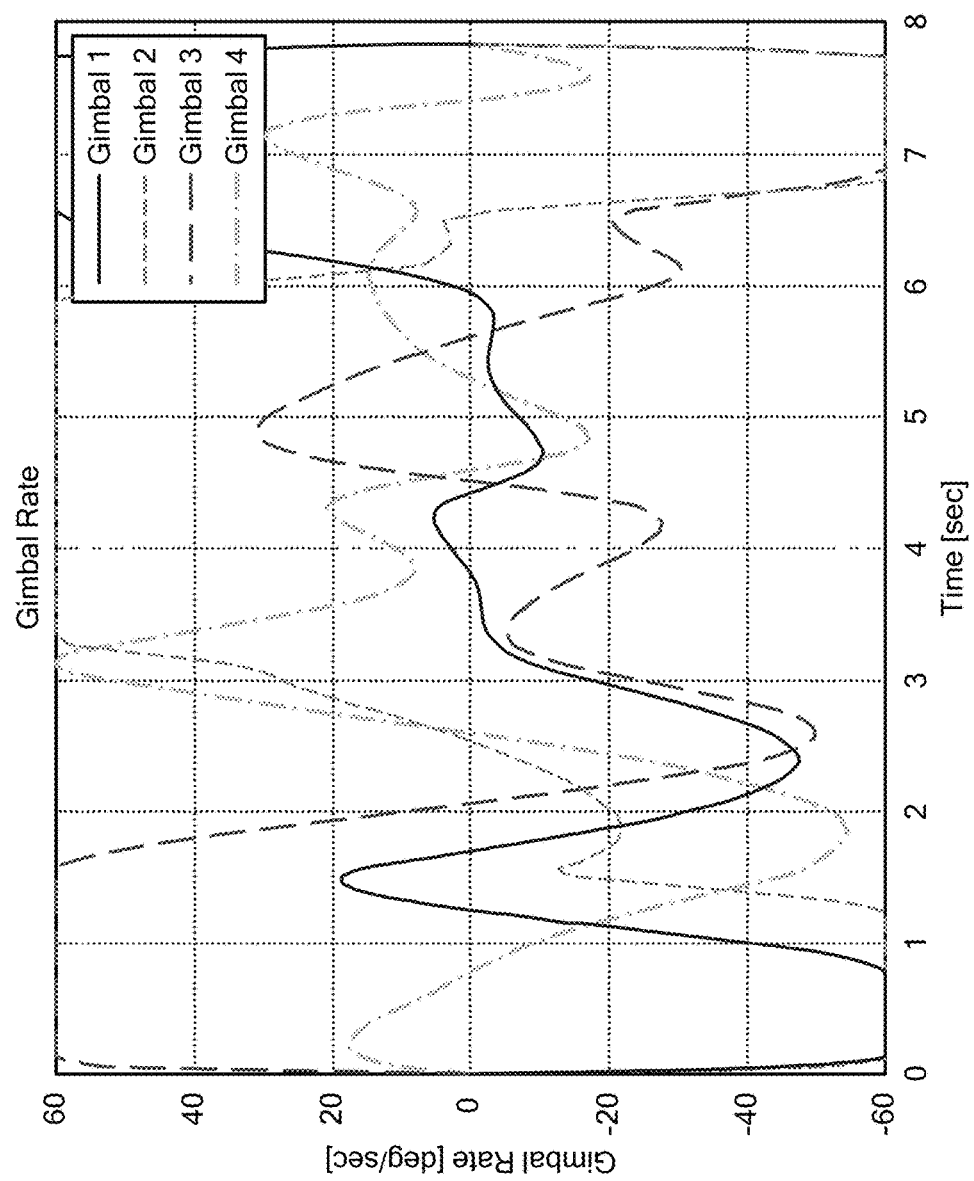
FIG. 8 shows GPOPS Optimized Gimbal Rate Trajectory, in accordance with one exemplary embodiment.

FIG. 8 shows GPOPS Optimized Gimbal Rate Trajectory, in accordance with one exemplary embodiment.

Figure 9:
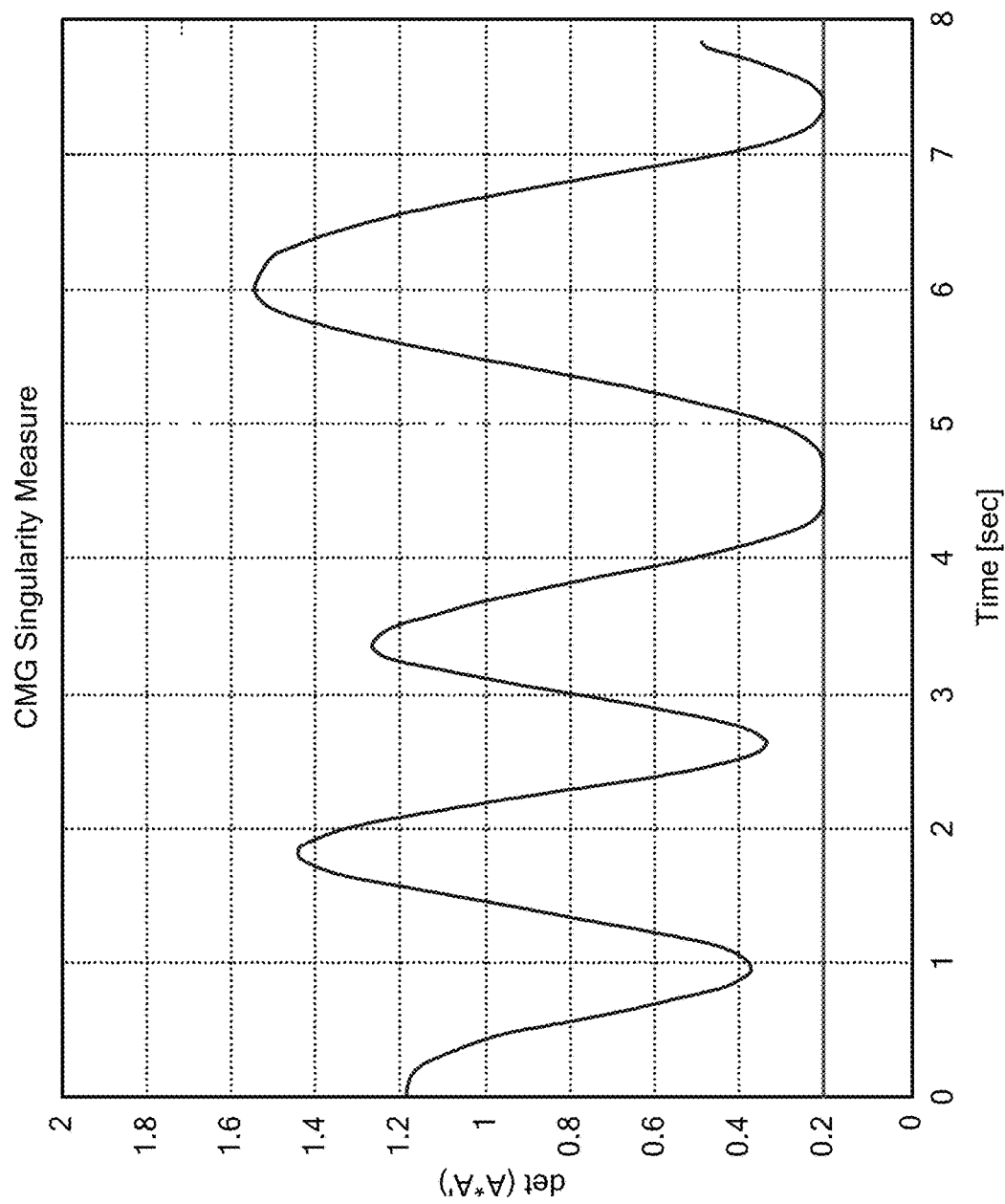
FIG. 9 shows GPOPS Optimized Singularity Measure Given Path Constraint, in accordance with one exemplary embodiment.

FIG. 9 shows GPOPS Optimized Singularity Measure Given Path Constraint, in accordance with one exemplary embodiment.

Figure 10:
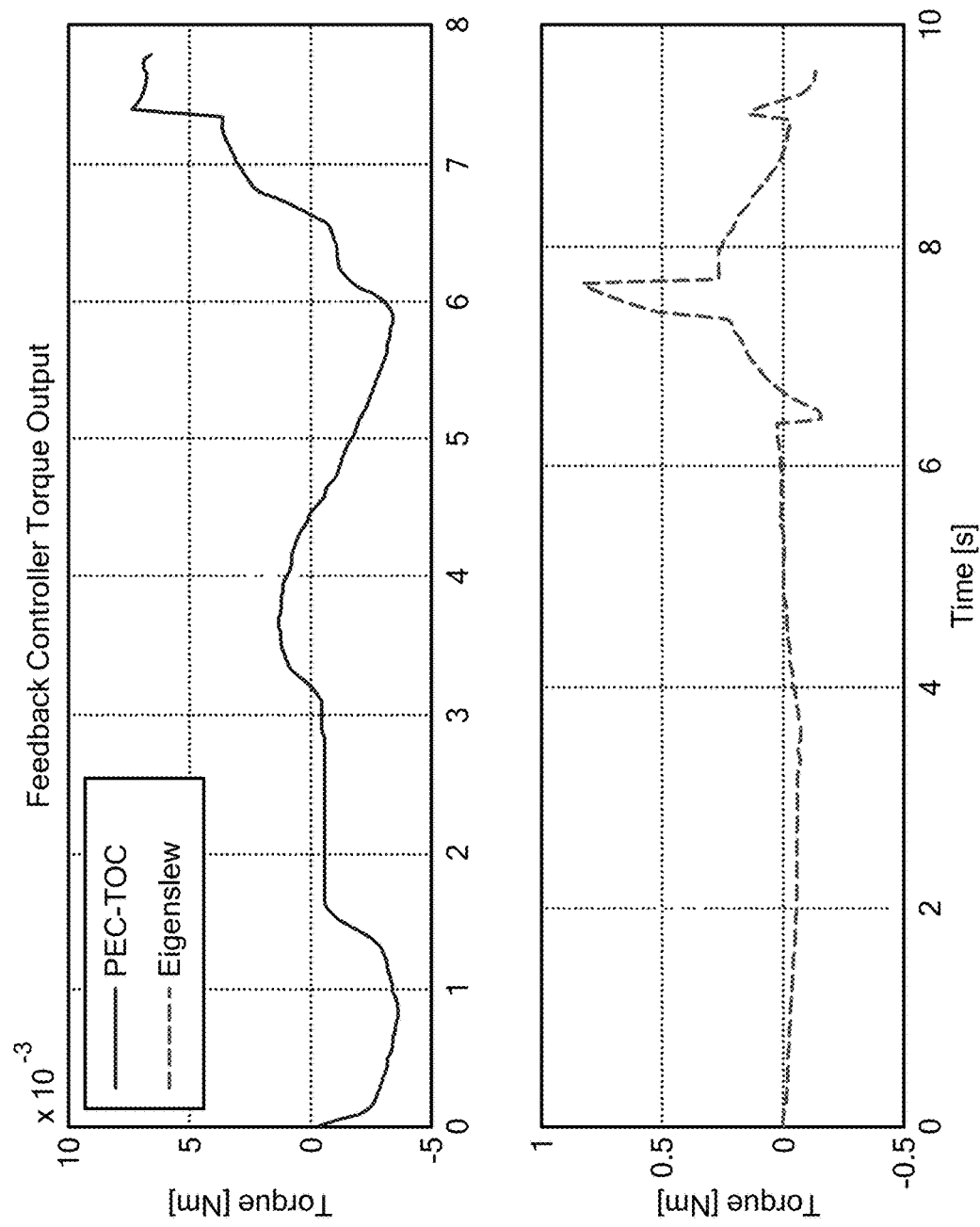
FIG. 10 is a graph showing the torque command corrections from the feedback controller for the PEC-TOC and eigenaxis slew maneuvers, in accordance with one exemplary embodiment.

FIG. 10 is a graph showing the torque command corrections from the feedback controller for the PEC-TOC and eigenaxis slew maneuvers, in accordance with one exemplary embodiment. As shown, the PEC-TOC maneuver performs best using low gains. This is desirable because high gains can induce chatter in the control. Achieving a fast slew using low gains indicates that the satellite closely follows the optimized trajectory. As expected, the low gains result in torque command corrections orders of magnitude smaller than the high gain required for the eigenaxis slew.

Figure 11:
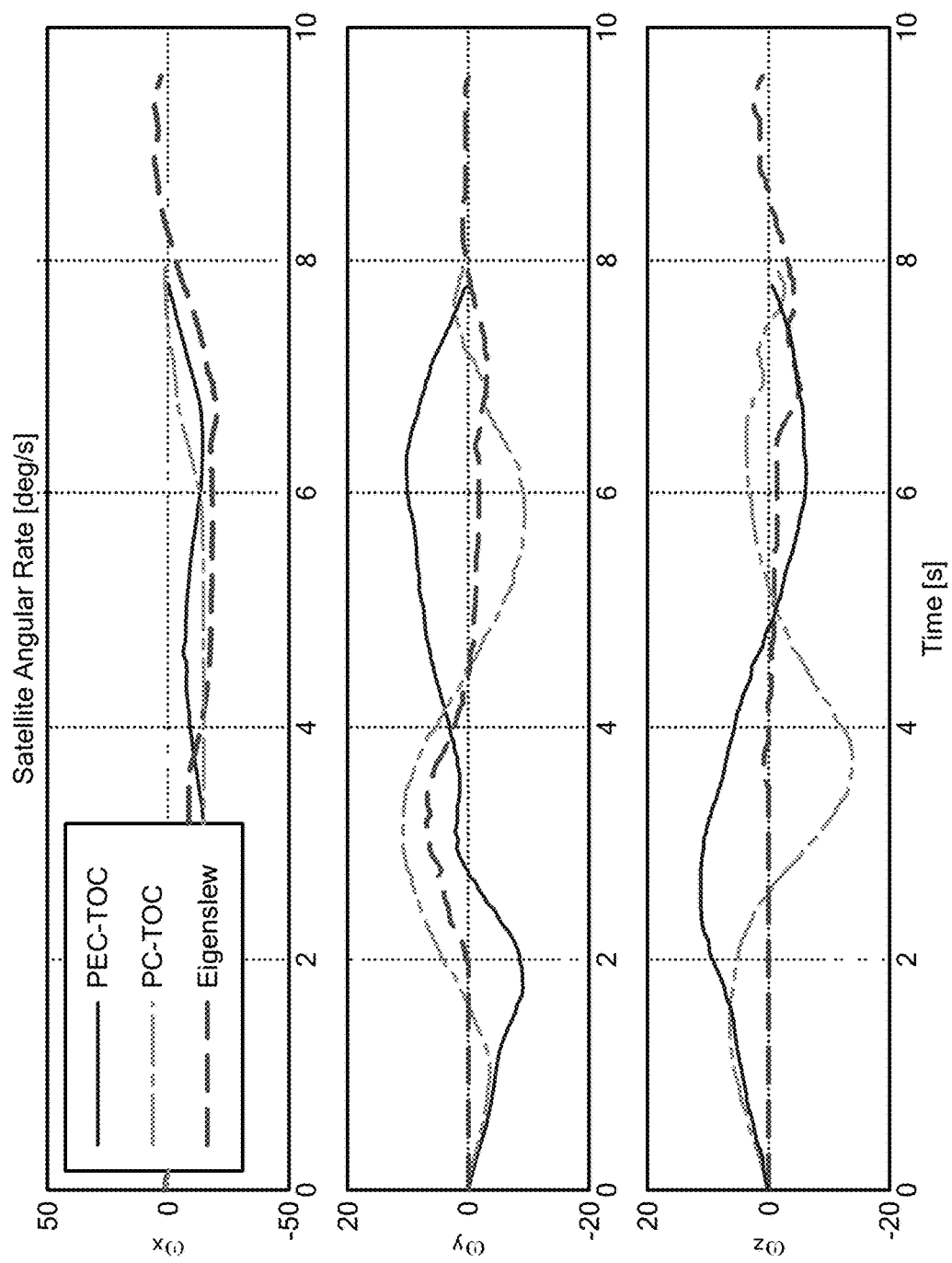
FIG. 11 is a graph showing the resulting satellite angular rates for the PEC-TOC, PC-TOC, and eigenaxis simulations, in accordance with one exemplary embodiment.

FIG. 11 is a graph showing the resulting satellite angular rates for the PEC-TOC, PC-TOC, and eigenaxis simulations, in accordance with one exemplary embodiment.

Figure 12:
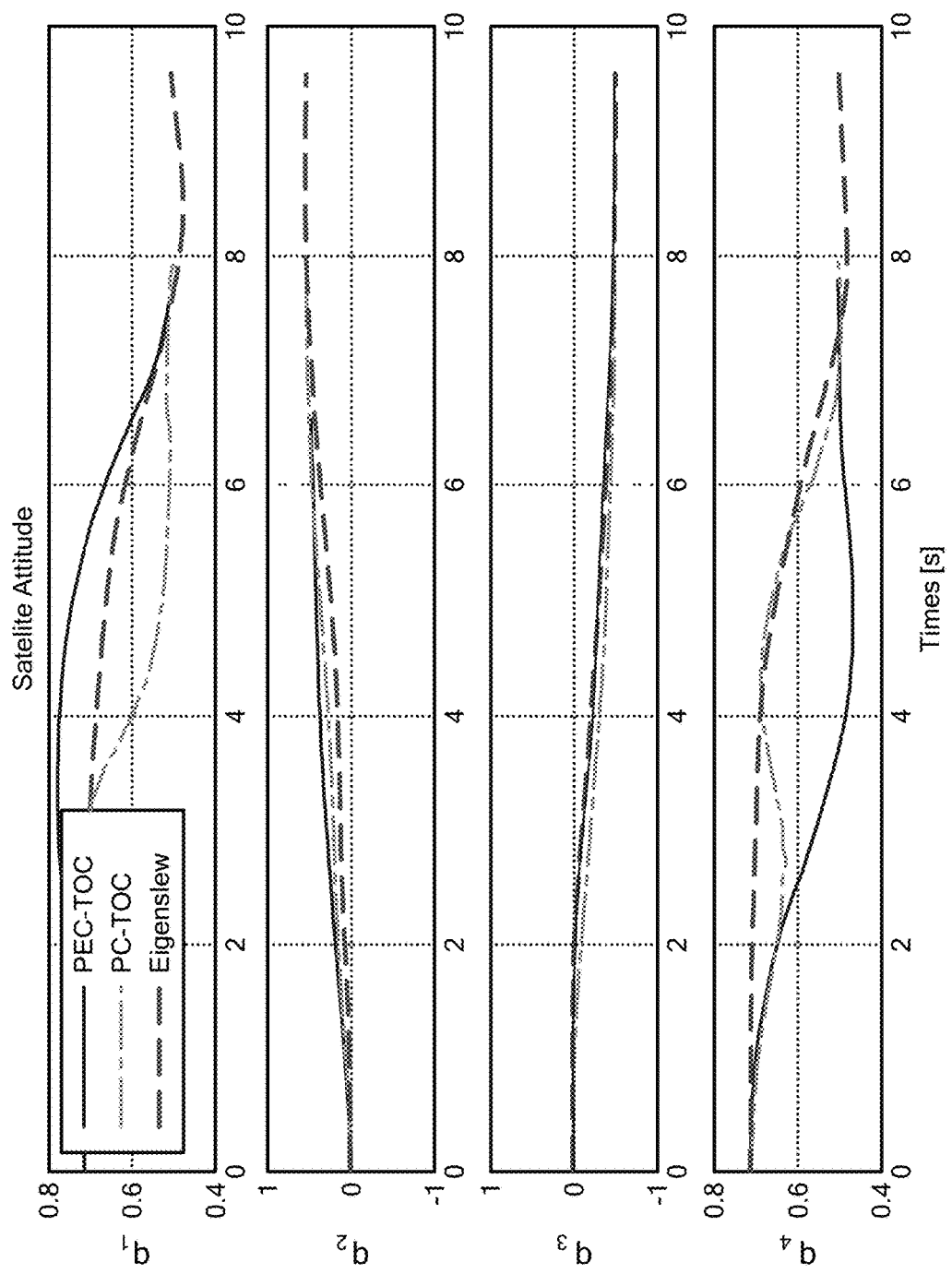
FIG. 12 is a graph showing the resulting satellite orientations for the PEC-TOC, PC-TOC, and eigenaxis simulations, in accordance with one exemplary embodiment.

FIG. 12 is a graph showing the resulting satellite orientations for the PEC-TOC, PC-TOC, and eigenaxis simulations, in accordance with one exemplary embodiment.

Figure 13:
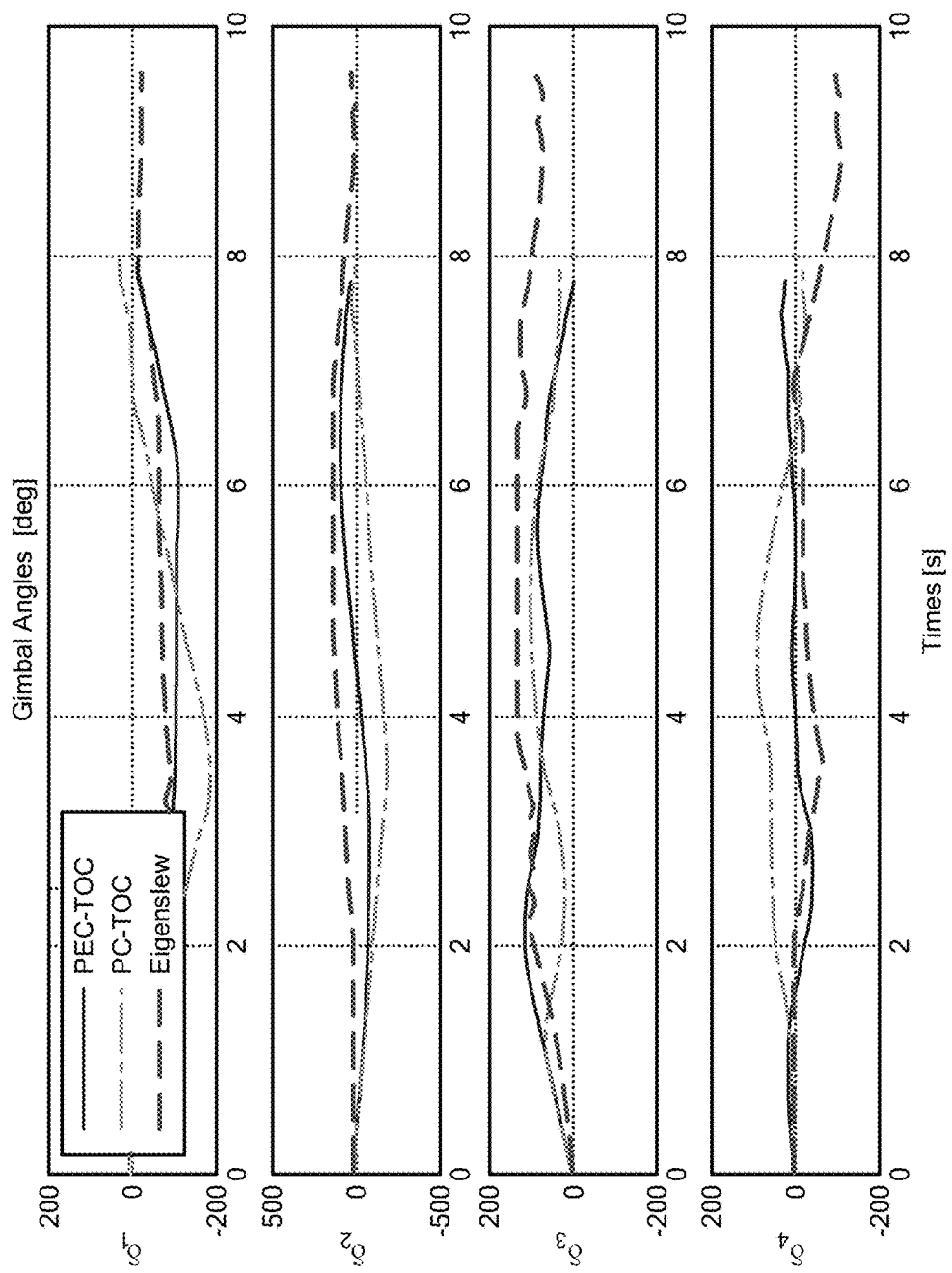
FIG. 13 is a graph showing the resulting gimbal angles for the PEC-TOC, PC-TOC, and eigenaxis simulations, in accordance with one exemplary embodiment.

FIG. 13 is a graph showing the resulting gimbal angles for the PEC-TOC, PC-TOC, and eigenaxis simulations, in accordance with one exemplary embodiment.

Figure 14:
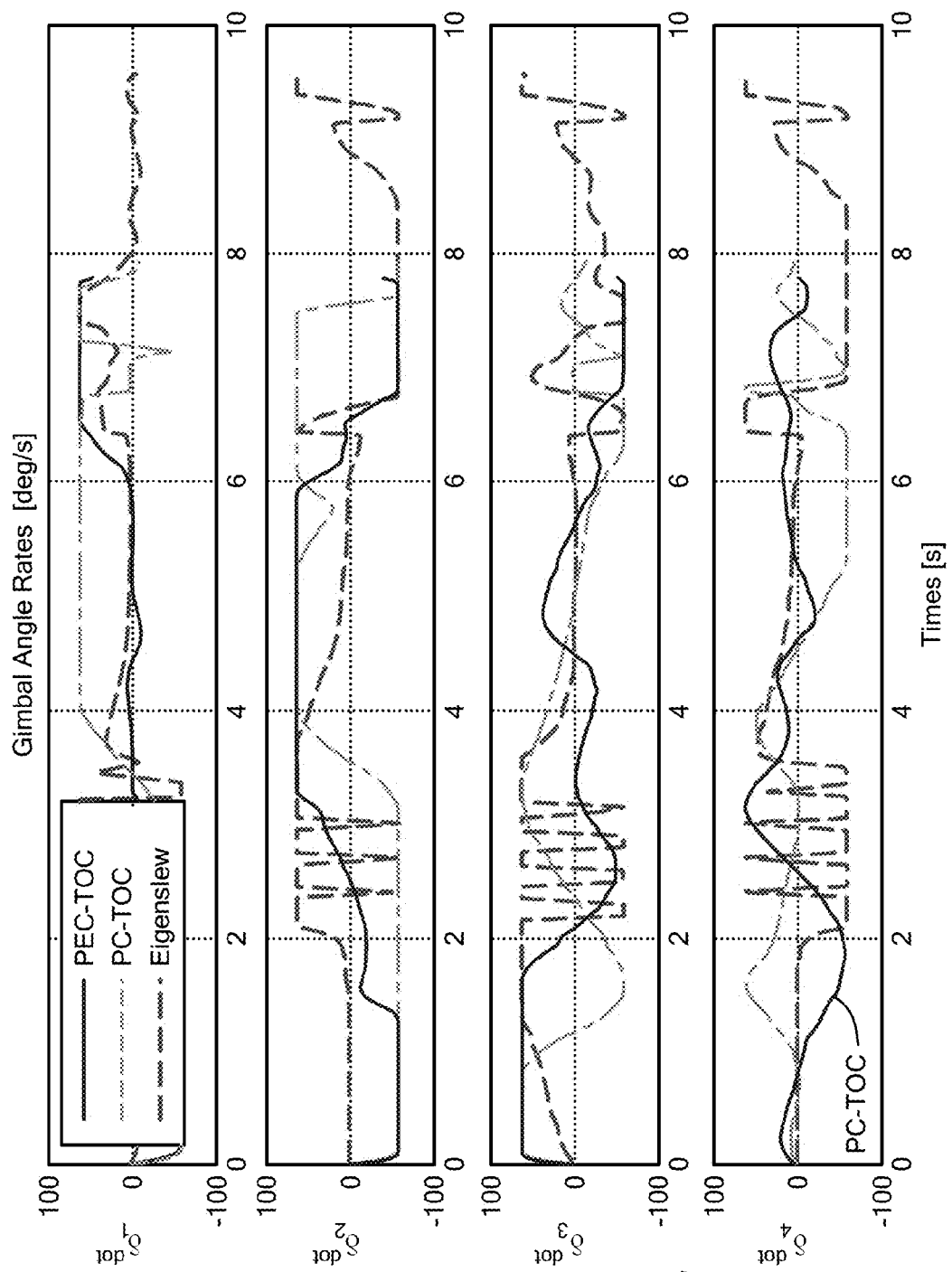
FIG. 14 is a graph showing the resulting gimbal rates for the PEC-TOC, PC-TOC, and eigenaxis simulations, in accordance with one exemplary embodiment.

FIG. 14 is a graph showing the resulting gimbal rates for the PEC-TOC, PC-TOC, and eigenaxis simulations, in accordance with one exemplary embodiment.

Figure 15:
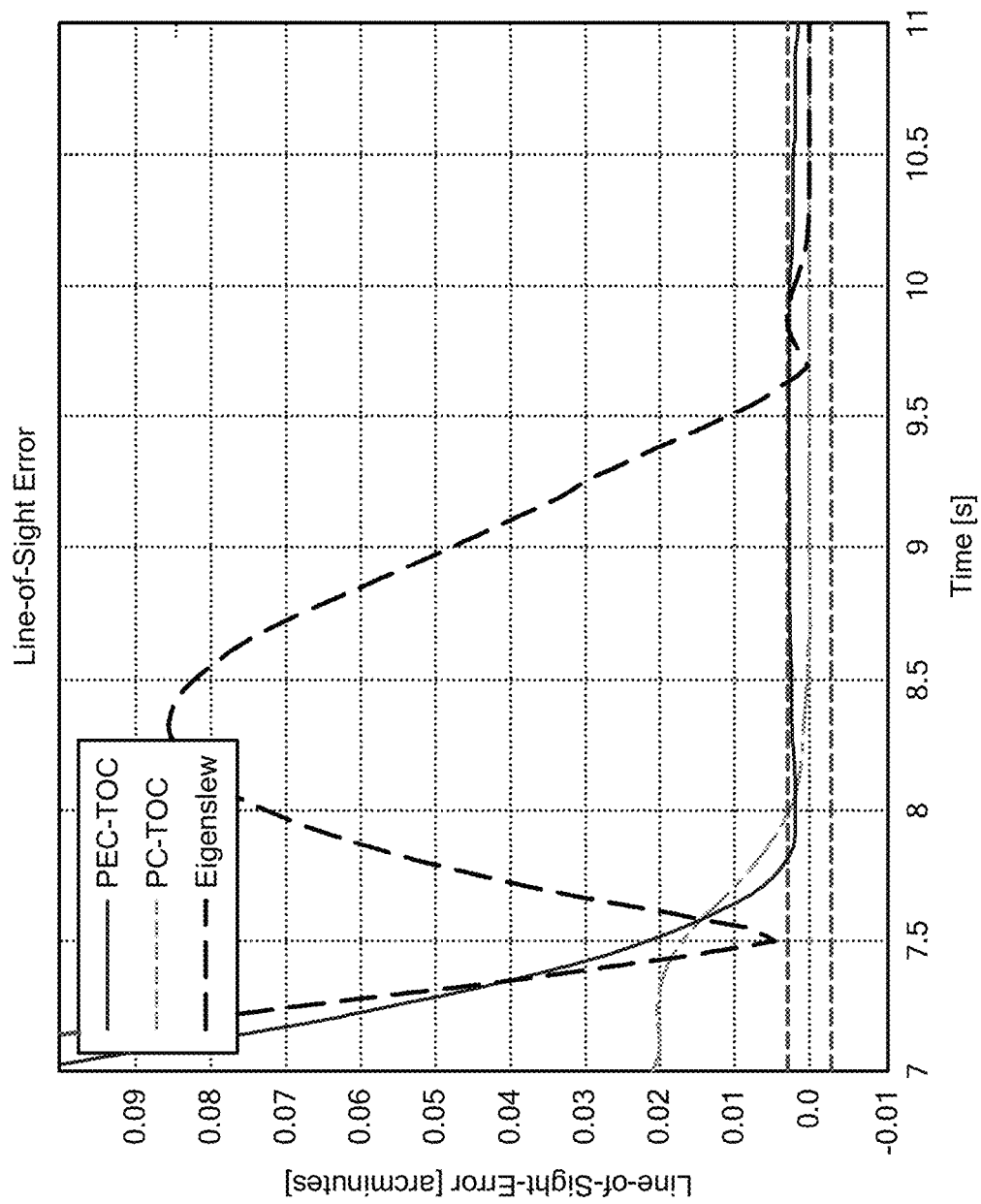
FIG. 15 is a graph showing line-of-sight error settling below 10 arc-minutes for the PEC-TOC, PC-TOC, and eigenaxis simulations, in accordance with one exemplary embodiment.

The first performance measure considered is the total slew time. For purposes of comparison, the slew was considered complete when the LOS error settled below 10 arc-minutes. FIG. 15 is a graph showing line-of-sight error settling below 10 arc-minutes (i.e., between the dashed lines) for the PEC-TOC, PC-TOC, and eigenaxis simulations, in accordance with one exemplary embodiment. As shown in FIG. 15, the PEC-TOC solution, which has a GPOPS solution that takes 7.8 seconds, completes in 7.8 seconds. The PC-TOC solution, which has a GPOPS solution that takes 7.7 seconds, completes in 7.95 seconds. The eigenaxis slew showed the worst performance, completing the maneuver in 9.6 seconds. In this case, the PEC-TOC solution shows an 18.75% time improvement over the eigenaxis slew.

Figure 16:
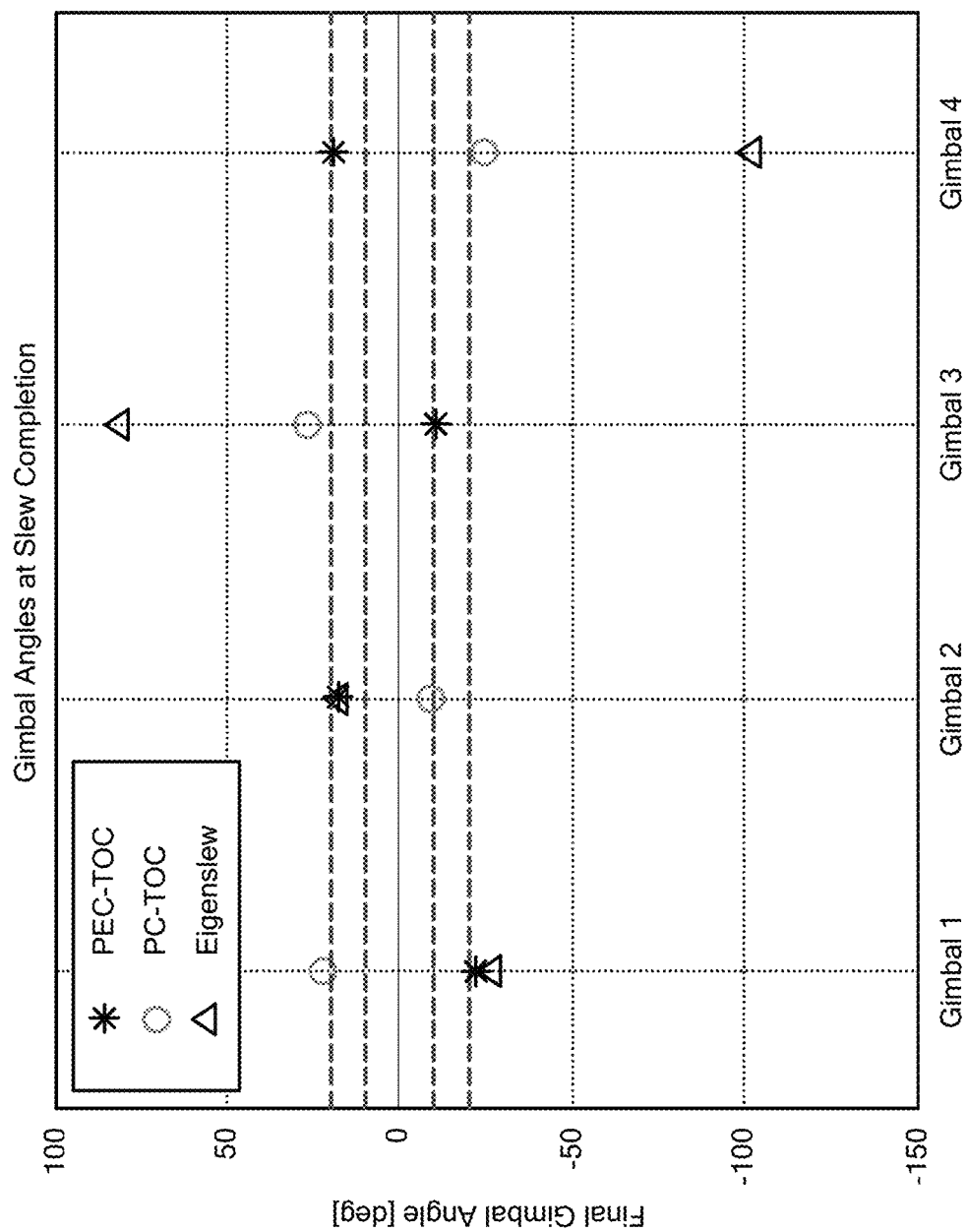
FIG. 16 is a graph showing gimbal angles at slew completion for the PEC-TOC, PC-TOC, and eigenaxis simulations, in accordance with one exemplary embodiment.

The second performance measure considered is the final orientation of the gimbals and their ability to produce the desired torque for precision pointing. FIG. 16 is a graph showing gimbal angles at slew completion for the PEC-TOC, PC-TOC, and eigenaxis simulations, in accordance with one exemplary embodiment. As shown in FIG. 16, the PEC-TOC gimbal angles all satisfy the endpoint constraint. Note that in the figure, the dashed lines mark the endpoint constraint gimbal angles of [−20 −10 10 20] degrees since the absolute value of the final gimbal angle must be between 10 and 20 degrees in this exemplary embodiment.

The final gimbal angles determine the torque that can be generated for precision pointing. The gimbal angles are mapped into a torque by the B matrix from Equations (2) and (3). Looking at the resulting B matrix for each maneuver in Equations (23)-(25) below, it can be seen that the PEC-TOC solution results in highly decoupled B matrix, which indicates efficient and effective torque generation with a minimum set of flywheels. For a positive commanded torque about the x-axis, $T_x$, the PEC-TOC solution only needed the second and fourth flywheels with 19% residual torque disturbance about the y-axis, whereas the eigenaxis solution required all four flywheels. Furthermore, although the PC-TOC solution resulted in a B matrix comparable to the PEC-TOC solution, the PC-TOC solution does not guarantee producing the desired B matrix as in the PEC-TOC solution.

$$B_{pectoc} = \begin{bmatrix} 0.1750 & -0.9498 & -0.1672 & 0.9548 \\ 0.9530 & -0.1807 & -0.9571 & 0.1715 \\ -0.2475 & 0.2556 & -0.2365 & 0.2426 \end{bmatrix} \quad (23)$$

$$B_{pctoc} = \begin{bmatrix} -0.1961 & -0.9435 & 0.2388 & 0.9139 \\ 0.9405 & 0.1913 & -0.9105 & -0.2344 \\ 0.2774 & -0.2706 & 0.3377 & -0.3315 \end{bmatrix} \quad (24)$$

$$B_{eigen} = \begin{bmatrix} 0.2759 & -0.8696 & 0.5770 & 0.0297 \\ 0.8784 & -0.2851 & -0.0293 & -0.5770 \\ -0.3902 & 0.4032 & 0.8162 & -0.8162 \end{bmatrix} \quad (25)$$

Figure 17:
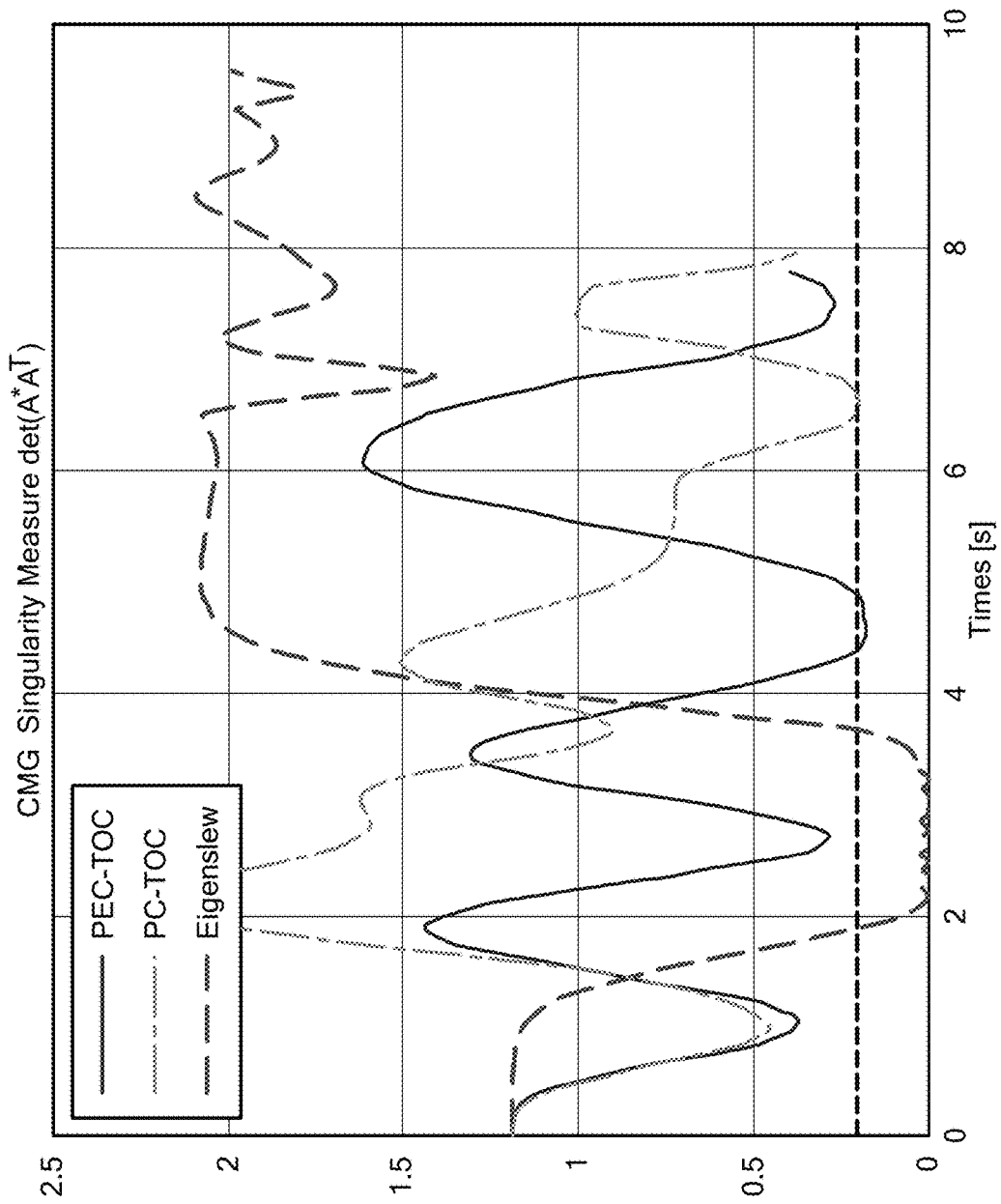
FIG. 17 is a graph showing the singularity measure, $\det(AA^T)$, for the PEC-TOC, PC-TOC, and eigenaxis simulations, in accordance with one exemplary embodiment.

The third performance measure considered is the singularity measure. FIG. 17 is a graph showing the singularity measure, $\det(AA^T)$, for the PEC-TOC, PC-TOC, and eigenaxis simulations, in accordance with one exemplary embodiment. Note that the dashed line shown in FIG. 17 marks the path constraint value, 0.2. As shown in FIG. 17, the singularity measures for the PEC-TOC and PC-TOC solutions do not go below 0.18, whereas the singularity measures for the eigenaxis solution follows a near singular arc between 2 and 4 seconds, getting as low as 0.0008 in that time. The effect of singularity is clearly shown in FIG. 17, which displays a clear signature of chatter between 2 and 4 seconds.

PEC-TOC with Momentum Management

Figure 19:
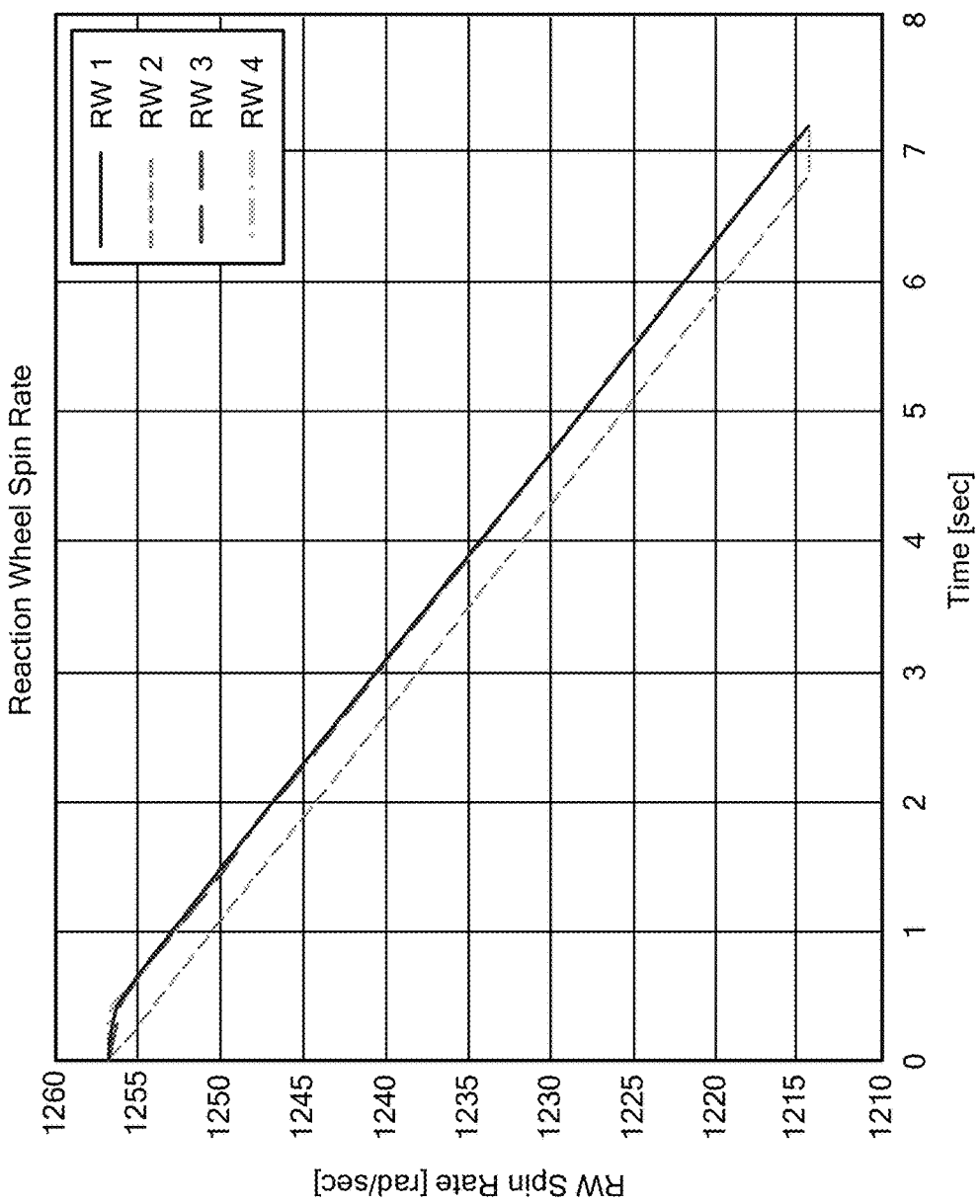
FIG. 19 is a graph showing the resulting reaction wheel spin rates in the PEC-TOC solution with momentum management simulation, in accordance with one exemplary embodiment.

The solver described above was used to generate an optimized momentum dumping solution for the slew example discussed in the SIMULATION section. The simulation parameters were the same, given in Table 2, the only difference being the final RW flywheel speeds, which are reduced from 12,000 to 11,594 RPM using constant acceleration, as shown in FIG. 19. In an exemplary embodiment, during tracking, the gimbal angle is fixed but the flywheel spin rate is changed, with the flywheel spin rate controlled by momentum management during slew.

Figure 18:
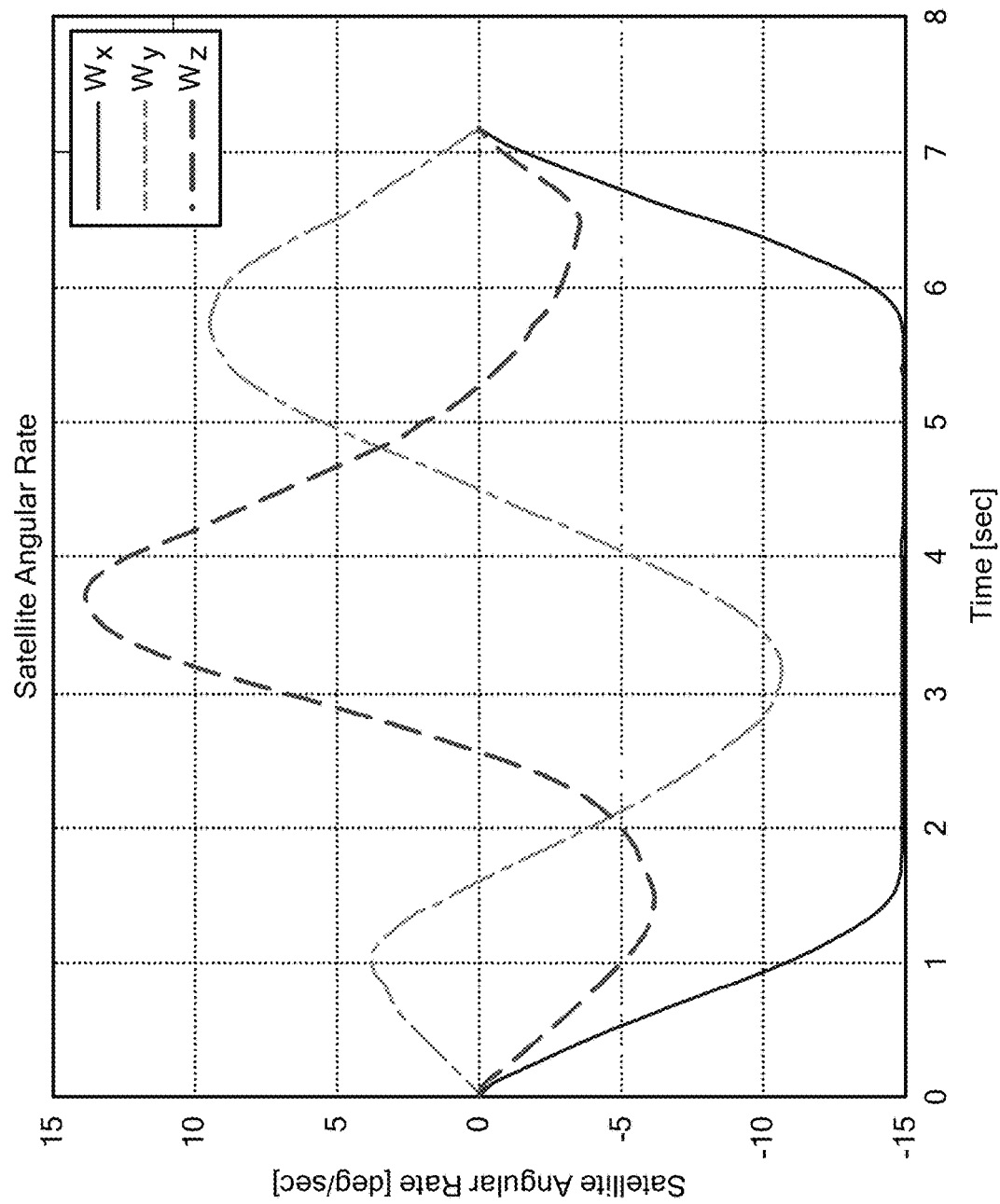
FIG. 18 is a graph showing the resulting satellite angular rates in the PEC-TOC solution with momentum management simulation, in accordance with one exemplary embodiment.

FIG. 18 is a graph showing the resulting satellite angular rates in the PEC-TOC solution with momentum management, in accordance with one exemplary embodiment.

FIG. 19 is a graph showing the resulting reaction wheel spin rates in the PEC-TOC solution with momentum management, in accordance with one exemplary embodiment.

Figure 20:
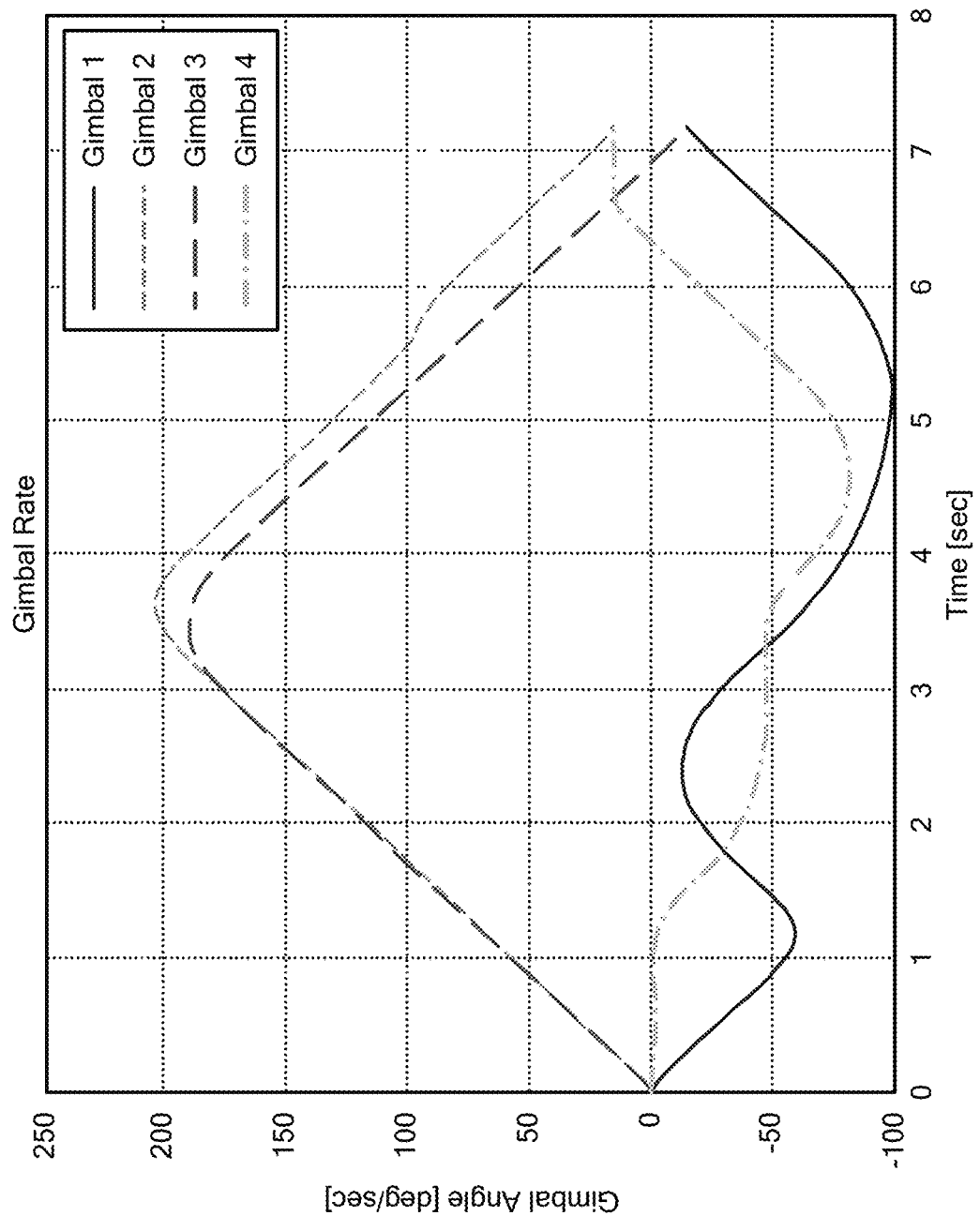
FIG. 20 is a graph showing the resulting gimbal angles in the PEC-TOC solution with momentum management simulation, in accordance with one exemplary embodiment.

FIG. 20 is a graph showing the resulting gimbal angles in the PEC-TOC solution with momentum management, in accordance with one exemplary embodiment.

Figure 21:
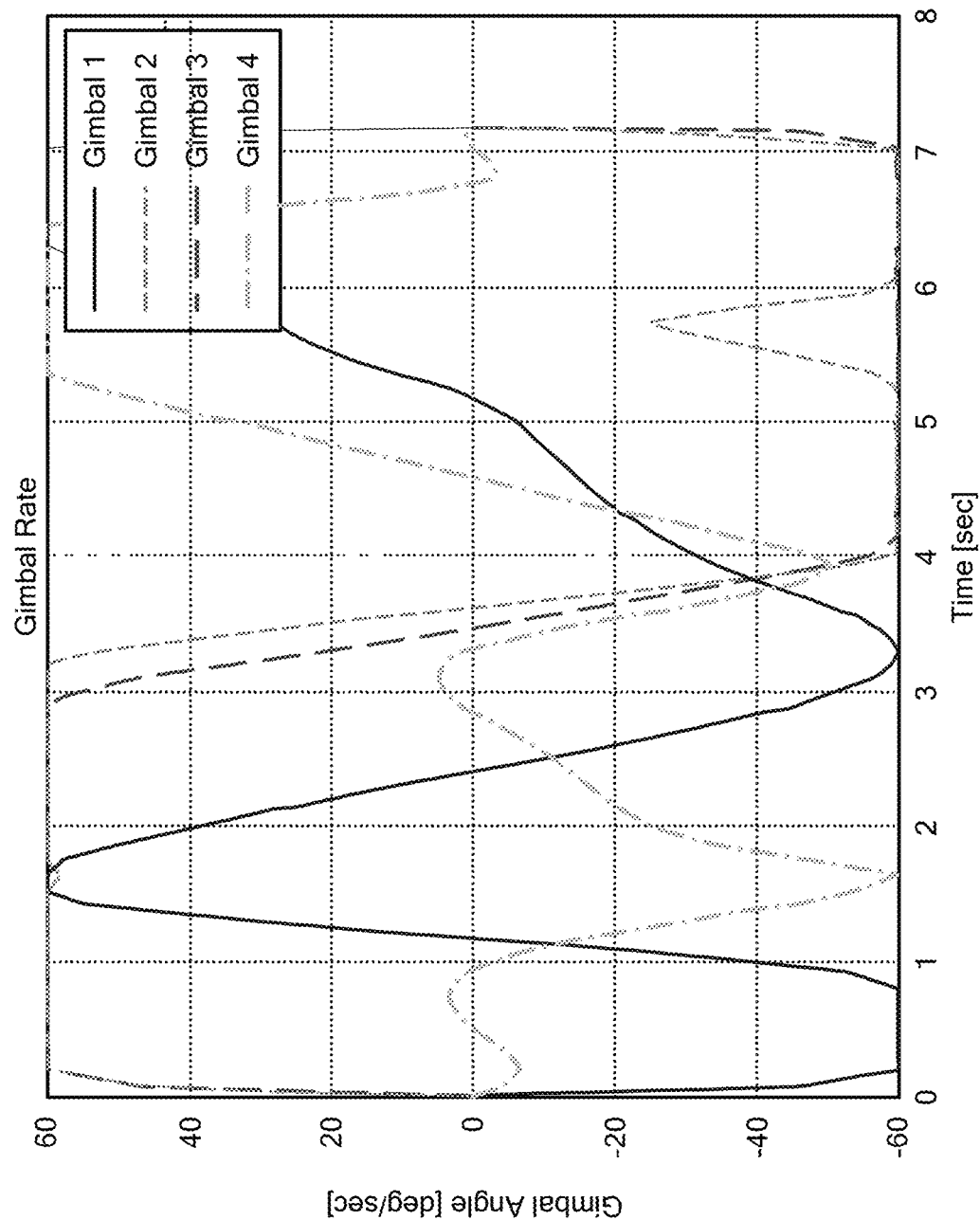
FIG. 21 is a graph showing the resulting gimbal rates in the PEC-TOC solution with momentum management simulation, in accordance with one exemplary embodiment.

FIG. 21 is a graph showing the resulting gimbal rates in the PEC-TOC solution with momentum management, in accordance with one exemplary embodiment.

Simulation results showed that momentum management reduced slew time to 7.2 seconds while still meeting the path and endpoint constraints. It was a very surprising result that the slew time with momentum management was shorter by 7.8% than that without momentum management. The inventors suspect that the shorter slew time is achieved by reduced angular momentum of the HCMGs due to slower spin-rates of the flywheels. In addition to reducing slew and settle time, PEC-TOC can be implemented using a minimal set of actuators (i.e., no need for additional actuators for momentum dumping), can increase mission time, and provides a more predictable final condition of slew, which can be the initial condition for the next slew, and which allows us to guess proper initial conditions for PEC-TOC that facilitates fast convergence.

Embedded Optimizer

As mentioned above, simulations of the PEC-TOC problem were solved offline using GPOPS-II and SNOPT. It would be impractical to use these tools in real-time, particularly running on the satellite's limited processing and memory resources. Therefore, in various embodiments, the satellite includes an embedded optimizer for generating retargeting commands based on sequential quadratic programming with sparse linear algebra, which is essentially a simplified version of SNOPT. Additionally, after an initial full optimization process is performed just before a slew and settle maneuver, the embedded optimizer initializes each successive sequential optimization using the optimal solution at the previous time step $t_{(k-1)}$ for the current optimal solution during the slew, which is possible because the dynamics and environment torque of PEC-TOC are deterministic and continuous during the slew and thus the optimization process from time to time is sequential. In this way, each successive sequential optimization can be completed within a few iterations, and in many cases only a single iteration, which allows for real-time optimization using the limiting computing resources of the satellite.

Figure 22:
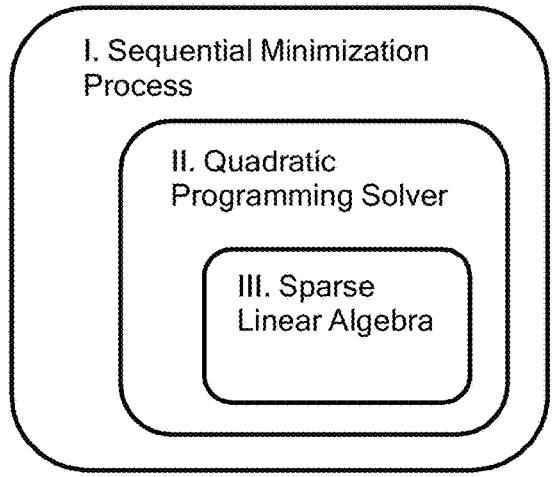
FIG. 22 is a schematic block diagram of an embedded optimizer, in accordance with one exemplary embodiment.

FIG. 22 is a schematic block diagram of an embedded optimizer, in accordance with one exemplary embodiment. The embedded optimizer includes a sequential minimization process, a quadratic programming solver, and a sparse linear algebra library. The sequential minimization process implements a sequential minimization algorithm of the type outlined by Reference 8. In an exemplary embodiment, the Wolfe line search [see Reference 11] and a merit function similar to Reference 8 are implemented to find a local minimal direction, and the damped Broyden-Fletcher-Goldfarb-Shanno (BFGS) method is used for the Hessian update [see Reference 11]. The quadratic programming solver implements a quadratic programming (QP) algorithm based on the active-set method [see Reference 9]. This significantly mitigates computational difficulties confronted in the nonlinear optimization process, although it is less efficient in computation than simplex-based algorithms. In particular, Karush-Kuhn-Tucker (KKT) repair and local infeasibility are avoided. The quadratic programming solver utilizes sparse linear algebra functions in the sparse linear algebra library.

An embedded optimizer of the type shown in FIG. 22 was successfully prototyped in MATLAB™. It can be considered as a customized slim version of NPOPT, which is SNOPT without sparse linear algebra. The MATLAB™ codes were autocoded to a set of C codes and then combined with the standard sparse linear algebra C library [see Reference 10]. The prototype implemented the sequential minimization process and the quadratic programming solver in MATLAB™ and then called MATLAB™ sparse linear algebra functions.

Figure 23:
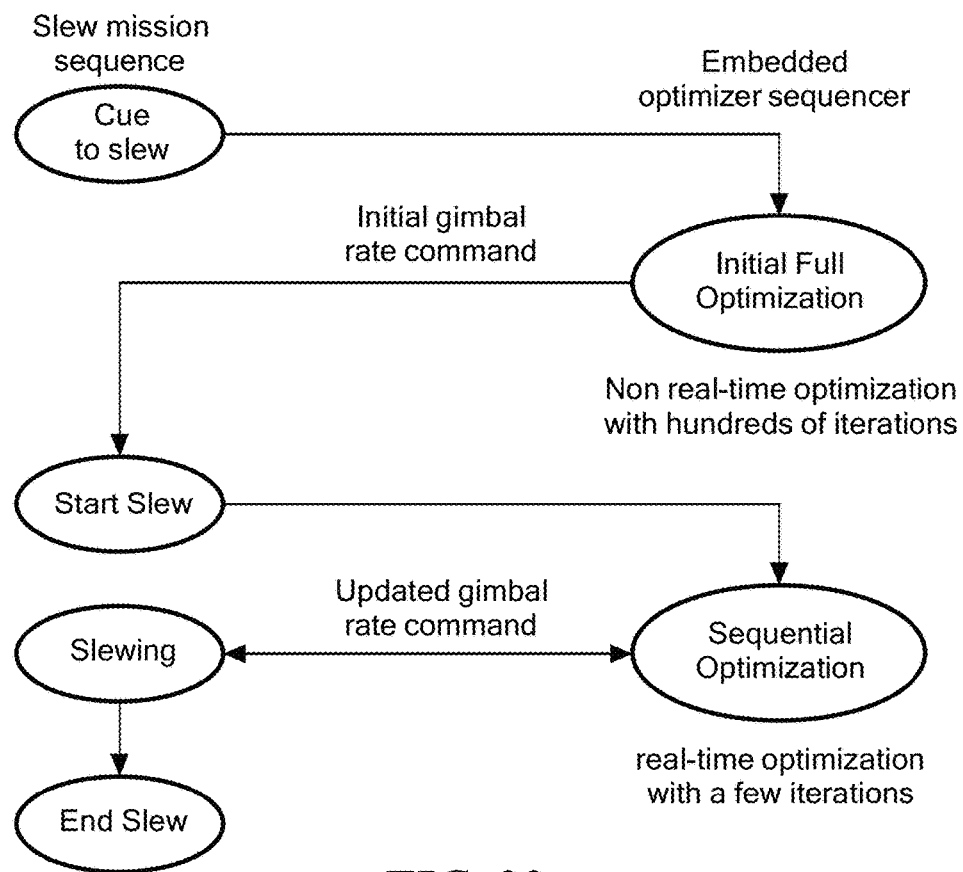
FIG. 23 is a schematic logic flow diagram of an embedded optimizer sequence, in accordance with one exemplary embodiment.

FIG. 23 is a schematic logic flow diagram of an embedded optimizer sequence, in accordance with one exemplary embodiment. FIG. 23 shows how the embedded optimizer can be integrated with the slew mission sequence. Specifically, upon a cue to slew, the embedded optimizer performs an initial full optimization, which is non real-time and may take hundreds of iterations. Since the slew/settle is repeatable in the PEC-TOC framework due to constrained end conditions, the initial full optimization can be solved over possible slew conditions on the ground and the results can be stored in a lookup table; the lookup table can efficiently replace this initial full optimization step. The initial full optimization produces all states used in the PEC-TOC as well as an initial gimbal rate command, which is used to start the slew (i.e., all states are needed for a "warm" start). Thereafter, each successive iteration starts with the results from the previous iteration and performs a sequential optimization taking at most only a few iterations in order to produce an updated gimbal rate command, which is used for slewing. After a number of sequential optimization iterations, the slewing ends.

The sequential minimization process can be viewed as solving to find a set of values x such that:

(a) Minimize F(x) subject to constraints [1] CL<=C(x)<=CU and [2] XL<=x<=XU, where F(x) is a set of equations derived from the PEC-TOC equations described above (e.g., discretized using pseudospectral conversion, for example, as discussed in Reference 3, Reference 7, Reference 12, each of which is hereby incorporated herein by reference in its entirety) and where constraints [1] and [2] are combined with F(x) via Lagrange multipliers ($\lambda$, $\mu$) in the optimization process;

(b) F(x) and C(x) are smooth nonlinear functions of (x); and (c) Gradient of F(x), $\Delta$F, and Jacobian of C(x), JC, are assumed to be available and can be derived numerically although analytical formulations are preferred for the fast optimization process.

The main idea of the sequential minimization is:

[a] Linearize the original nonlinear optimization problem around current x (x_cur);

[b] Solve the linear QP (quadratic programming) subproblem to find $\Delta x = 1/\alpha$ (x_next−x_cur);

[c] Determine $\alpha$, called line search, to have the value of a merit function decreased significantly, where the merit function includes the penalty cost of violated [1] and [2] constraints with slack variables (s and t), and where the merit function includes penalty parameters ($\phi$ and $\theta$); and

[d] Recycle to step [b] with new x_next.

The sequential minimization process can be applied to two different problems:

[i] Generate a new rapid slew and settle trajectory from previous slew trajectory, upon slew queue; and

[j] Tune, during slew, the initial slew trajectory calculated upon slew queue but before actual slew.

Figure 24:
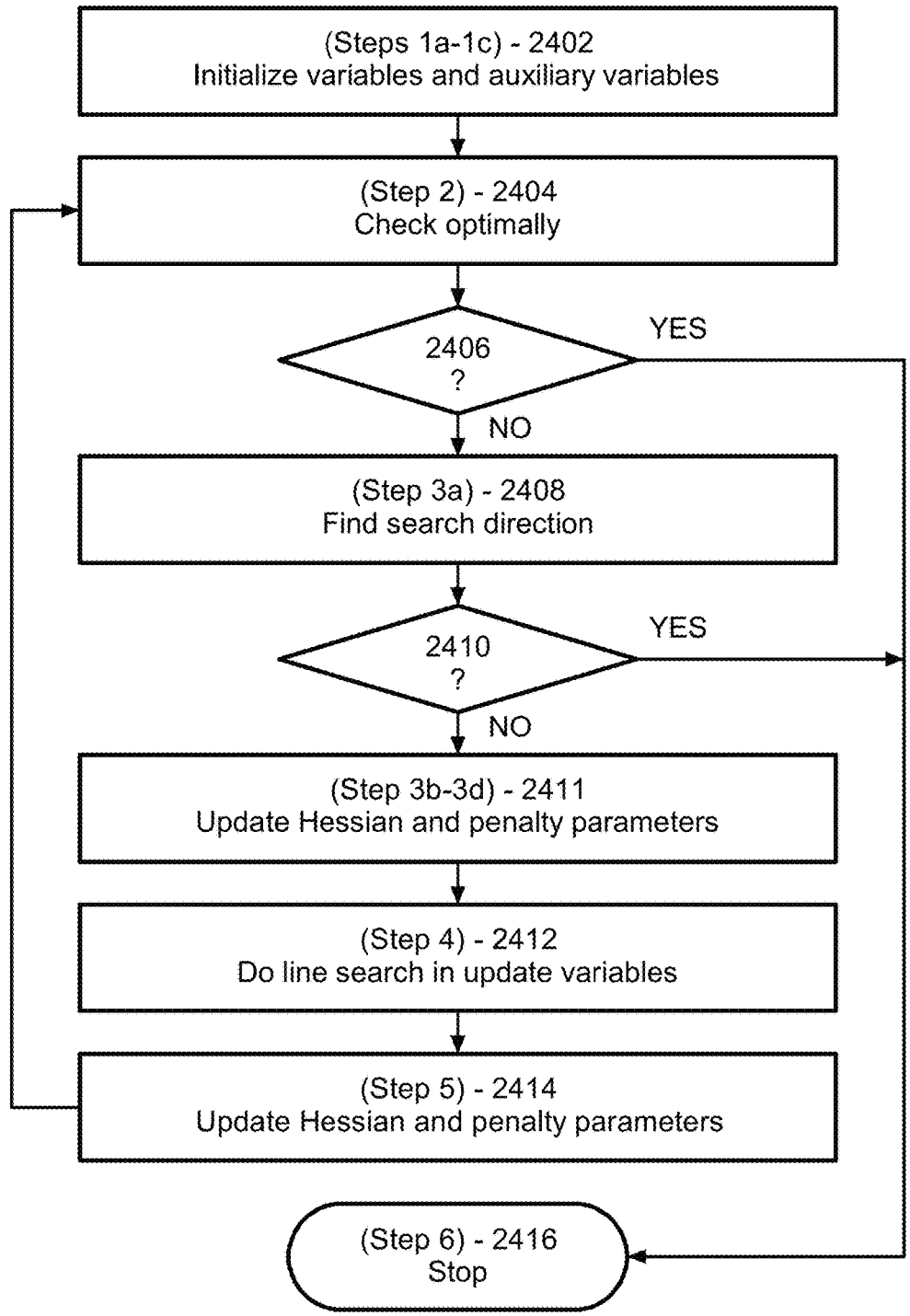
FIG. 24 is a logic flow diagram for solving the sequential minimization process, in accordance with one exemplary embodiment.

FIG. 24 is a logic flow diagram for solving the sequential minimization process, in accordance with one exemplary embodiment. In this exemplary embodiment, the sequential minimization process involves the following steps:

[Step 1a—Block 2402] Initialize optimized variable x_old with previous optimal trajectory. The previous optimal trajectory may come from either [i] or [j]. If it comes from [i], then the previous slew trajectory with similar slew conditions (e.g., initial and final quaternion states) works better (e.g., the slew of satellite in orbit may be very deterministic normally and may be characterized and planned in advance). If slew conditions are different, the previous optimal trajectory is linearly scaled to meet the slew conditions.

[Step 1b—Block 2402] Solve a QP subproblem with x_old and find initial $\lambda$_old and $\mu$_old. Specifically, find p, $\lambda$, $\mu$ that minimizes $\Delta F^T p + \frac{1}{2} p^T H p$ subject to BL<=[JC p; p]<=BU, where BL=[CL; C] and BU=[CU; C]. H (Hessian) may be set to identity matrix. Any QP solver can be used here (e.g., Maes "a regularized active-set method for sparse convex quadratic programming" [see Reference 9]). Automatic repairing Hessian and KKT "K" matrix of QP subproblem, which is a very common but critical issue in sequential quadratic programming for nonlinear optimization, is achieved by using perturbed Hessian and KKT "K" matrix, e.g., H+$\epsilon$I instead of H.

[Step 1c—Block 2402] Set penalty parameters $\phi$_old and $\theta$_old to 0.

[Step 2—Block 2404] Check KKT optimality condition KKT:$\Delta$F=(JC) T*$\lambda$+$\mu$. If the optimality condition is met (YES in block 2406), the optimization stops (i.e., go to Step 6—Block 2416). Otherwise, the optimization continues (i.e., go to Step 3—Block 2408).

[Step 3a—Block 2408] Solve the QP subproblem with x_old and find p (=$\Delta$x), $\lambda$_new and $\mu$_new. Specifically, find p, $\lambda$, $\mu$ that minimizes $\Delta F^T p + \frac{1}{2} p^T H p$ subject to BL<=[JC p; p]<=BU, where BL=[CL; C] and BU=[CU; C]. The value of p tends to be small near the local optimality. If the value of p is small, i.e., less than a predetermined threshold (YES in block 2410), the optimization stops (i.e., go to Step 6—Block 2416). Otherwise, the optimization continues (i.e., go to Block 2411).

[Step 3b—Block 2411] Calculate $\Delta\lambda$(=$\lambda$_new−$\lambda$_old) and $\Delta\mu$(=$\mu$_new−$\mu$_old).

[Step 3c—Block 2411] Calculate slack variables (s and t) and $\Delta s$(=(JC) p+(C−s)) and $\Delta t$(=p+(x_old−t)), where S and t are calculated by Eq (2.26) and (2.27) of Betts "Practical Methods for Optimal Control and Estimation using Nonlinear Programming" pp 55, section 2.4 Merit function [see Reference 8].

[Step 3d—Block 2411] Repair Hessian matrix (H), e.g., by Levenberg modification introduced by Betts "Practical Methods for Optimal Control and Estimation using Nonlinear Programming" pp 57, section 2.6.1 Minimization Process [see Reference 8]. Optionally, Maes' QP solver simplifies this step by using H=H+$\epsilon$I, if $\epsilon$ is large and otherwise ignoring H [see Reference 9].

[Step 4—Block 2412] Do line search increment factor ($\alpha$) to determine new values of optimized variables and auxiliary variables for next iteration, e.g., x_new=x_old+$\alpha$ p. Calculate increment ratio alpha using wolfe-search2. The algorithm follows that of Wright & Nocedal "Numerical Optimization", pp. 60-62, section 3.4. If alpha is very small, it implies that the search is being attempted near a local minima. In this case, alpha is reset to 1.0. [x; $\lambda$; $\mu$; s; t] are updated and named as "old" for the next iteration. At first iteration, $\alpha$ is set to 1 without running line search.

[Step 5—Block 2414] Update Hessian (H) and penalty parameters ($\phi$ and $\theta$) and recycle to Step 2—Block 2404. In Step 5, updated H, $\phi$ and $\theta$ are named as "old" for the next iteration [Step 5]. Use rank-2 BFGS update algorithm of Wright & Nocedal "Numerical Optimization", pp 537, section 18.3. Hessian matrix may be dense and approximate but requires no computation of actual Hessian (H=Jacobian (F)+$\lambda$*Jacobian (C)). This update is a good practical choice. Penalty parameters can be computed by Eq (2.35) of Betts "Practical Methods for Optimal Control and Estimation using Nonlinear Programming" pp 55, section 2.4 Merit function [see Reference 8].

Figure 25:
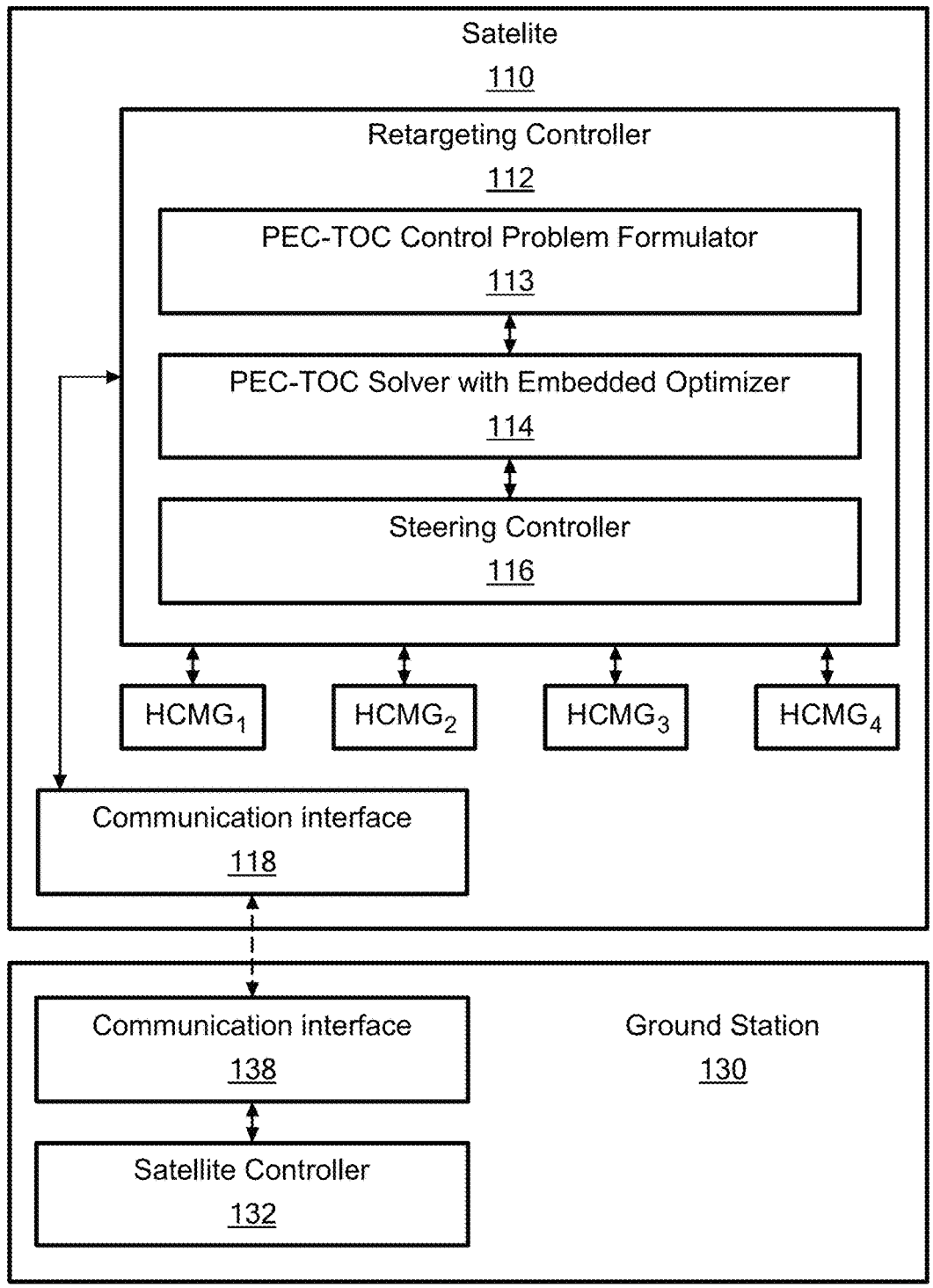
FIG. 25 is a schematic block diagram showing a satellite and corresponding ground station, in accordance with one exemplary embodiment.

FIG. 25 is a schematic block diagram showing a satellite 110 and corresponding ground station 130, in accordance with one exemplary embodiment. Among other things, the satellite 110 includes a retargeting controller 112 that generates and provides retargeting commands for four HCMGs 110$_1$, 110$_2$, 110$_3$, 110$_4$ (referred to collectively as HCMGs 110). The satellite 110 also includes a communication interface 118 that allows communication between the satellite 110 and the ground station 130. Among other things, the ground station 130 includes a satellite controller 132 and a communication interface 138 that allows communication between the satellite 110 and the ground station 130.

The retargeting controller 112 is configured to perform retargeting of the satellite 110 from an initial state through a desired slew and settle maneuver to a desired final state using path and endpoint constrained time-optimal control. Specifically, the retargeting controller 112 is configured to determine a set of gimbal angular rate vectors based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators and to produce retargeting commands for the hybrid control moment gyroscopes based on the set of gimbal angular rate vectors. Additionally, the retargeting controller 112 may be further configured to determine a set of reaction wheel angular rate vectors for controlling flywheel spin rates of the reaction wheel actuators for performing momentum management during slew without the use of external actuators and to produce the retargeting commands based on the set of gimbal angular rate vectors and the set of reaction wheel angular rate vectors. The retargeting controller 112 is typically configured to use, as the initial state, final state information from a prior control problem solution.

In certain exemplary embodiments, the retargeting controller 112 can be physically or logically configured to include a PEC-TOC control problem formulator 113, a PEC-TOC control problem solver with embedded optimizer 114, and a steering controller 116. The PEC-TOC control problem formulator 113 is configured to formulate a control problem based on the initial state, the desired final state, and the predetermined set of path and endpoint constraints. The PEC-TOC control problem solver 114 is configured to solve the formulated control problem to determine the set of gimbal angular rate vectors and optionally also the set of reaction wheel angular rate vectors. The steering controller 116 is configured to produce the retargeting commands based on the set of gimbal angular rate vectors and optionally also the set of reaction wheel angular rate vectors.

In certain exemplary embodiments, the retargeting controller 112 can operate autonomously to retarget the satellite 110 from the initial state to the desired final state. For example, the retargeting controller 112 may determine the desired final state, formulate the PEC-TOC control problem, solve the PEC-TOC control problem, generate the retargeting commands, and provide the retargeting commands to the HCMGs 110. The retargeting controller 112 may include various sensors (not shown for convenience) allowing the retargeting controller 112 to monitor the progress of the slew and settle maneuver as part of a closed-loop control mechanism, making adjustments as needed to ensure that the satellite 110 ends up in the desired final state.

In other exemplary embodiments, the satellite controller 132 of the ground station 130 may provide some or all of the retargeting information to the retargeting controller 112. For example, the satellite controller 132 may provide the desired final state information to the retargeting controller 112 so that the retargeting controller 112 can formulate and solve the control problem, or the satellite controller 132 may formulate and solve the control problem and provide the angular rate vectors or the retargeting commands to the retargeting controller 112.

Figure 26:
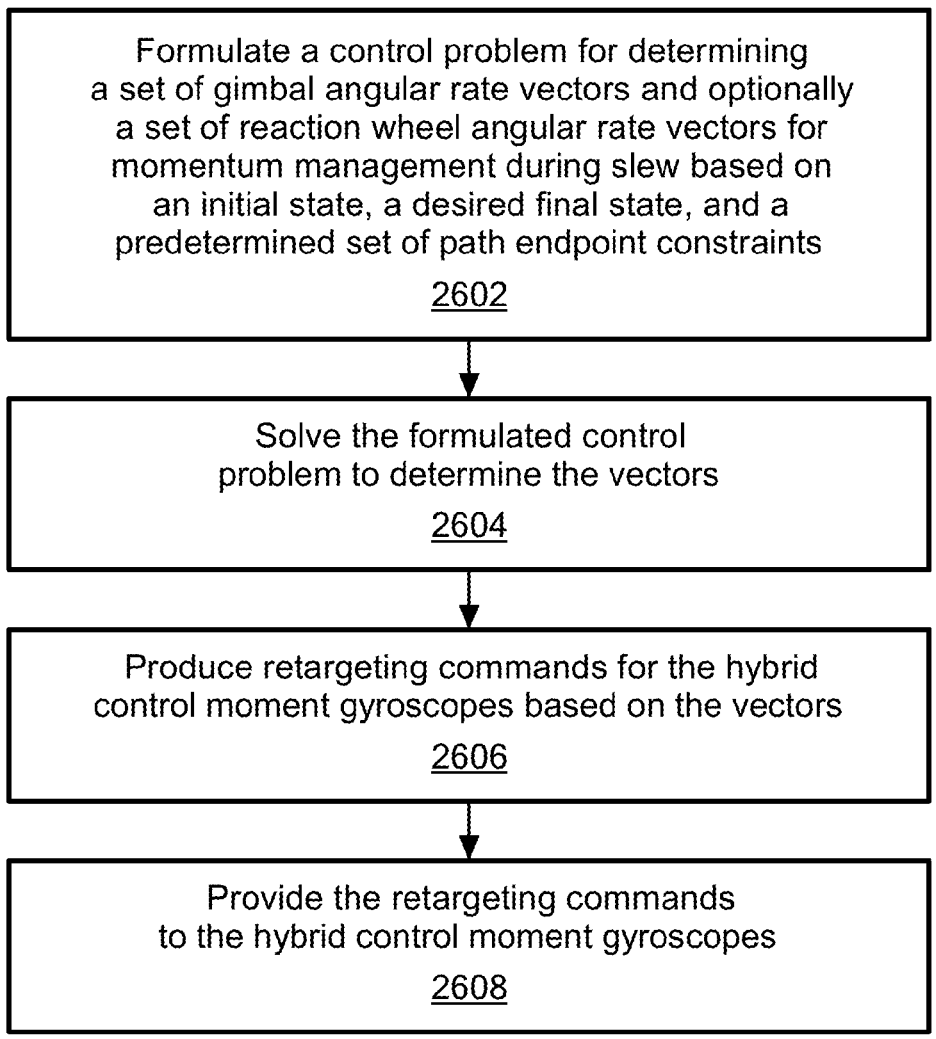
FIG. 26 is a logic flow diagram describing a method for retargeting a satellite from an initial state through a desired slew and settle maneuver to a desired final state using path and endpoint constrained time-optimal control, in accordance with one exemplary embodiment of the present invention.

FIG. 26 is a logic flow diagram describing a method for retargeting a satellite from an initial state through a desired slew and settle maneuver to a desired final state using path and endpoint constrained time-optimal control, in accordance with one exemplary embodiment of the present invention. In block 2602, a control problem is formulated for determining a set of gimbal angular rate vectors and optionally a set of reaction wheel angular rate vectors for momentum management during slew based on an initial state, a desired final state, and a predetermined set of path and endpoint constraints. In block 2604, at least one processor is used to solve the formulated control problem to determine the vectors. In block 2606, retargeting commands are produced for the hybrid control moment gyroscopes based on the vectors. In block 2608, the retargeting commands are provided to the hybrid control moment gyroscopes to perform the slew and settle maneuver.

Miscellaneous

It should be noted that headings are used above for convenience and are not to be construed as limiting the present invention in any way.

Satellites and ground stations of the type discussed above generally includes one or more network communication interfaces for communicating over a communication channel (e.g., with a ground station and/or other satellites or devices) and at least one processor (e.g., a microprocessor with memory and other peripherals, a programmable logic device, and/or application-specific hardware) configured accordingly to perform the retargeting controller functions described herein.

Various aspects of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the retargeting controller and satellite controller described herein) are necessarily non-conventional because, absent special programming or configuration, the conventional components do not inherently perform the described non-conventional functions.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A satellite attitude control system for a satellite, the satellite attitude control system comprising:
   four hybrid control moment gyroscopes arranged in a pyramid configuration, each hybrid control moment gyroscope including a control moment gyroscope actuator and a reaction wheel actuator; and
   a retargeting controller for retargeting the satellite from an initial state through a desired slew and settle maneuver to a desired final state using path and endpoint constrained time-optimal control, the retargeting controller configured to determine a set of gimbal angular rate vectors based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators and to produce retargeting commands for the hybrid control moment gyroscopes based on the set of gimbal angular rate vectors.

2. A satellite attitude control system according to claim 1, wherein the gimbal angles of each hybrid control moment gyroscope k are constrained by an endpoint constraint:

$$C_{LE} \leq |\sin(\delta_k(t_f))| \geq C_{UE}$$

where $\delta_k$ is the k-th gimbal angle $t_f$ is the total slew and settle time, $C_{LE}$ is a lower bound and $C_{UE}$ is an upper bound.

3. A satellite attitude control system according to claim 2, wherein the gimbal angles at the end of the slew maneuver are constrained to be between 10 and 20 degrees, and wherein $C_{LE}=\sin(10°)$ and $C_{UE}=\sin(20°)$.

4. A satellite attitude control system according to claim 1, wherein the retargeting controller comprises:
   a PEC-TOC control problem formulator configured to formulate a control problem based on the initial state, the desired final state, and the predetermined set of path and endpoint constraints;
   a PEC-TOC control problem solver configured to solve the formulated control problem to determine the set of gimbal angular rate vectors; and
   a steering controller configured to produce the retargeting commands based on the set of gimbal angular rate vectors.

5. A satellite attitude control system according to claim 4, wherein the PEC-TOC control problem solver includes an embedded optimizer configured to use, as the initial state, one of:
   final state information from a prior control problem solution;
   a previous slew profile with similar beginning and ending conditions; or
   information from a lookup table that contains a set of pre-computed initialization states.

6. A satellite attitude control system according to claim 1, wherein the retargeting controller is further configured to determine a set of reaction wheel angular rate vectors for controlling flywheel spin rates of the reaction wheel actuators for performing momentum management during slew without the use of external actuators and to produce the retargeting commands based on the set of gimbal angular rate vectors and the set of reaction wheel angular rate vectors.

7. A satellite attitude control system according to claim 6, wherein the flywheel acceleration for each hybrid control moment gyroscope k is formulated as a constraint on desired final flywheel spin rate and is modeled as:

$$\dot{\Omega} = \frac{1}{\tau_{RW}}(u_{RW} - \Omega)$$

where $\Omega$ is the reaction wheel spin rate, $\dot{\Omega}$ is the derivative of the reaction wheel spin rate, $T_{RW}$ is the reaction wheel actuator motor time constant and $u_{RW}$ is the reaction wheel actuator acceleration.

8. A retargeting controller for retargeting a satellite from an initial state through a desired slew and settle maneuver to a desired final state using path and endpoint constrained time-optimal control, the satellite having four hybrid control moment gyroscopes arranged in a pyramid configuration, each hybrid control moment gyroscope including a control moment gyroscope actuator and a reaction wheel actuator, the retargeting controller comprising:
   a PEC-TOC control problem formulator configured to formulate a control problem based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators; and
   a PEC-TOC control problem solver configured to solve the formulated control problem to determine a set of gimbal angular rate vectors for the hybrid control moment gyroscopes.

9. A retargeting controller according to claim 8, further comprising:
   a steering controller configured to produce retargeting commands for the hybrid control moment gyroscopes based on the set of gimbal angular rate vectors.

10. A retargeting controller according to claim 8, wherein the PEC-TOC control problem solver includes an embedded optimizer configured to use, as the initial state, one of:
    final state information from a prior control problem solution;
    a previous slew profile with similar beginning and ending conditions; or
    information from a lookup table that contains a set of pre-computed initialization states.

11. A retargeting controller according to claim 8, wherein the gimbal angles of each hybrid control moment gyroscope k are constrained by an endpoint constraint:

$$C_{LE} \leq |\sin(\delta_k(t_f))| \geq C_{UE}$$

where $\delta_k$ is the k-th gimbal angle, $t_f$ is the total slew and settle time, $C_{LE}$ is a lower bound and $C_{UE}$ is an upper bound.

12. A retargeting controller according to claim 11, wherein the gimbal angles at the end of the slew maneuver are constrained to be between 10 and 20 degrees, and wherein $C_{LE}=\sin(10°)$ and $C_{UE}=\sin(20°)$.

13. A retargeting controller according to claim 8, wherein the retargeting controller is further configured to determine a set of reaction wheel angular rate vectors for controlling flywheel spin rates of the reaction wheel actuators for performing momentum management during slew without the use of external actuators and to produce the retargeting commands based on the set of gimbal angular rate vectors and the set of reaction wheel angular rate vectors.

14. A retargeting controller system according to claim 13, wherein the flywheel acceleration for each hybrid control moment gyroscope k is formulated as a constraint on desired final flywheel spin rate and is modeled as:

$$\dot{\Omega} = \frac{1}{\tau_{RW}}(u_{RW} - \Omega)$$

where $\Omega$ is the reaction wheel spin rate, $\dot{\Omega}$ is the derivative of the reaction wheel spin rate, $T_{RW}$ is the reaction wheel actuator motor time constant and $u_{RW}$ is the reaction wheel actuator acceleration.

15. A method for retargeting a satellite from an initial state through a desired slew and settle maneuver to a desired final state using path and endpoint constrained time-optimal control, the satellite having four hybrid control moment gyroscopes arranged in a pyramid configuration, each hybrid control moment gyroscope including a control moment gyroscope actuator and a reaction wheel actuator, the method comprising:

using at least one processor, determining a set of gimbal angular rate vectors based on the initial state, the desired final state, and a predetermined set of path and endpoint constraints selected to avoid control moment gyroscope actuator singularities and reaction wheel actuator singularities and to ensure that the hybrid control moment gyroscopes will complete the slew maneuver in a configuration capable of performing the settle maneuver using the reaction wheel actuators;

producing retargeting commands for the hybrid control moment gyroscopes based on the set of gimbal angular rate vectors; and providing the retargeting commands to the hybrid control moment gyroscopes.

16. A method according to claim 15, wherein determining the set of gimbal angular rate vectors comprises:

formulating a control problem based on the initial state, the desired final state, and the predetermined set of path and endpoint constraints; and solving the formulated control problem to determine the set of gimbal angular rate vectors.

17. A method according to claim 15, wherein the gimbal angles of each hybrid control moment gyroscope k are constrained by an endpoint constraint:

$$C_{LE} \leq |\sin(\delta_k(t_f))| \geq C_{UE}$$

where $\delta_k$ is the k-th gimbal angle, $t_f$ is the total slew settle time, $C_{LE}$ is a lower bound and $C_{UE}$ is an upper bound.

18. A method according to claim 17, wherein the gimbal angles at the end of the slew maneuver are constrained to be between 10 and 20 degrees, and wherein $C_{LE}=\sin(10°)$ and $C_{UE}=\sin(20°)$.

19. A method according to claim 15, wherein determining the set of gimbal angular rate vectors comprises one of:

using, as the initial state, final state information from a prior control problem solution;

using, as the initial state, a previous slew profile with similar beginning and ending conditions; or using, as the initial state, information from a lookup table that contains a set of pre-computed initialization states.

20. A method according to claim 15, wherein determining the set of gimbal angular rate vectors further comprises determining a set of reaction wheel angular rate vectors for controlling flywheel spin rates of the reaction wheel actuators for performing momentum management during slew without the use of external actuators, and wherein producing the retargeting commands for the hybrid control moment gyroscopes further comprises producing the retargeting commands based on the set of gimbal angular rate vectors and the set of reaction wheel angular rate vectors.

21. A method according to claim 20, wherein the flywheel acceleration for each hybrid control moment gyroscope k is modeled as:

$$\dot{\Omega} = \frac{1}{\tau_{RW}}(u_{RW} - \Omega)$$

where $\Omega$ is the reaction wheel spin rate, $\dot{\Omega}$ is the derivative of the reaction wheel spin rate, $T_{RW}$ is the reaction wheel actuator motor time constant and $u_{RW}$ is the reaction wheel actuator acceleration.

22. A method according to claim 15, wherein the gimbal angular rate vectors are determined by at least one processor in the satellite.

23. A method according to claim 15, wherein the gimbal angular rate vectors are determined by a ground station and transmitted to the satellite.

* * * * *